(12) United States Patent
Shastri et al.

(10) Patent No.: US 11,729,256 B2
(45) Date of Patent: Aug. 15, 2023

(54) PREDETERMINING NETWORK ROUTE FOR CONTENT STEERING

(71) Applicant: Netflix, Inc., Los Gatos, CA (US)

(72) Inventors: Ishaan Shastri, San Jose, CA (US); James Schek, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 17/503,236

(22) Filed: Oct. 15, 2021

(65) Prior Publication Data

US 2023/0119538 A1 Apr. 20, 2023

(51) Int. Cl.
G06F 15/16 (2006.01)
H04L 67/1001 (2022.01)
H04L 45/02 (2022.01)

(52) U.S. Cl.
CPC .......... H04L 67/1001 (2022.05); H04L 45/04 (2013.01)

(58) Field of Classification Search
CPC ............................ H04L 67/1002; H04L 45/04
See application file for complete search history.

(56) References Cited

U.S. PATENT DOCUMENTS

| | | | | |
|---|---|---|---|---|
| 6,658,000 | B1 * | 12/2003 | Raciborski | H04L 67/101 370/386 |
| 8,479,242 | B1 | 7/2013 | Chen et al. | |
| 8,527,635 | B2 * | 9/2013 | Jeon | H04L 67/1034 709/226 |
| 9,235,625 | B2 * | 1/2016 | Lewis | G06F 16/951 |
| 2008/0086750 | A1 * | 4/2008 | Yasrebi | H04N 21/84 348/E7.071 |
| 2011/0276423 | A1 * | 11/2011 | Davidson | H04N 21/44016 705/26.1 |
| 2011/0282968 | A1 * | 11/2011 | Oliver | H04L 67/303 709/217 |
| 2012/0158713 | A1 * | 6/2012 | Jin | G06F 16/435 707/E17.014 |

(Continued)

OTHER PUBLICATIONS

Notice of Allowance dated Mar. 23, 2023 in related U.S. Appl. No. 17/503,237.

(Continued)

*Primary Examiner* — Razu A Miah
(74) *Attorney, Agent, or Firm* — Greenberg Traurig, LLP

(57) ABSTRACT

The disclosed computer-implemented method includes determining that incoming media item requests are to be skewed from a random distribution among server nodes, using a random distribution algorithm, to a directed distribution among the server nodes. The method then includes identifying, in a loading assignment, which media items are to be loaded onto specific server nodes to produce the directed distribution of media item requests. The method next includes preloading the identified media items onto the server nodes according to the loading assignment and receiving media item requests for the preloaded media items. The method then includes routing the received media item requests to the server nodes using the random distribution algorithm, where the random distribution algorithm is skewed to the directed distribution based on the preloading of the media items according to the identified loading assignment. Various other methods, systems, and computer-readable media are also disclosed.

20 Claims, 12 Drawing Sheets

(56) References Cited

U.S. PATENT DOCUMENTS

| | | | |
|---|---|---|---|
| 2012/0324043 A1* | 12/2012 | Burkard | H04L 67/5681 |
| | | | 709/217 |
| 2015/0012656 A1 | 1/2015 | Phillips et al. | |
| 2015/0088972 A1* | 3/2015 | Brand | H04L 45/126 |
| | | | 709/203 |
| 2016/0337426 A1* | 11/2016 | Shribman | H04N 21/6125 |
| 2017/0279875 A1 | 9/2017 | Gupta et al. | |
| 2018/0097912 A1 | 4/2018 | Chumbalkar et al. | |
| 2020/0084486 A1* | 3/2020 | Cho | H04N 21/44204 |

OTHER PUBLICATIONS

Final Office Action dated Dec. 14, 2022 in related U.S. Appl. No. 17/503,237.

* cited by examiner

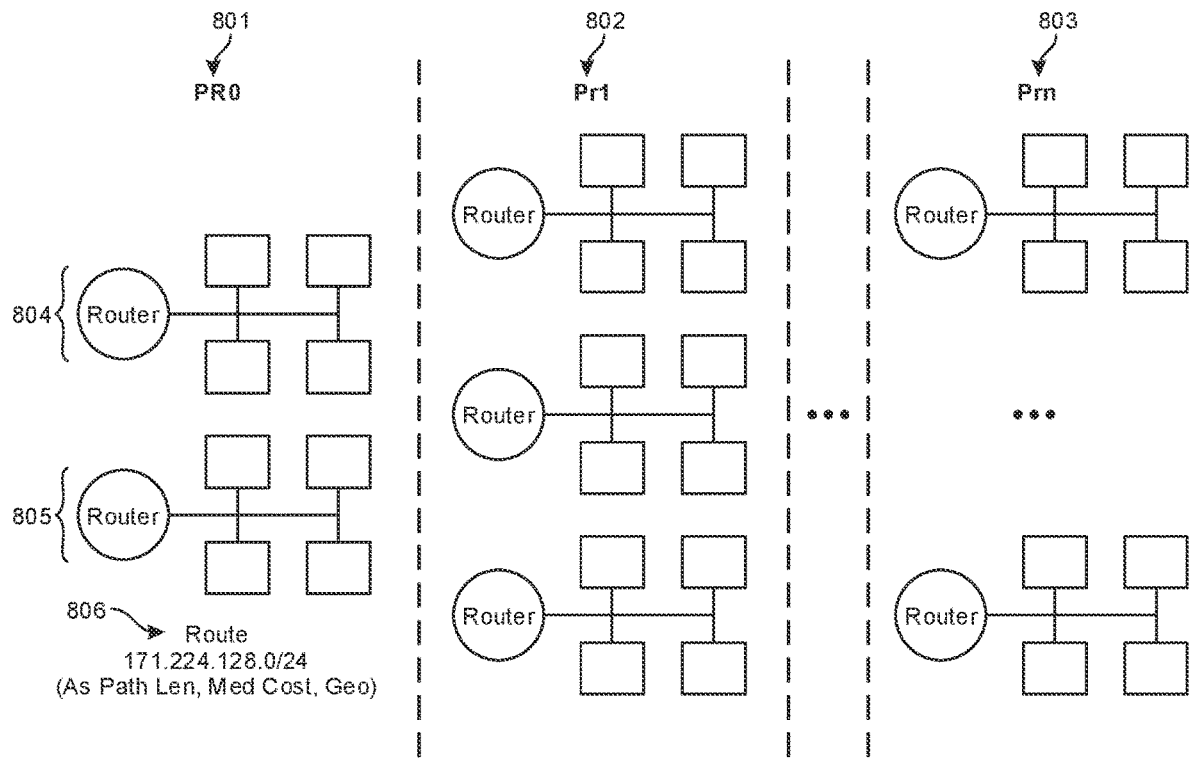
FIG. 8
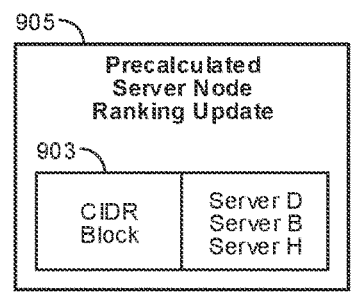
FIG. 9A
FIG. 9B

PREDETERMINING NETWORK ROUTE FOR CONTENT STEERING

BACKGROUND

In the past, when users attempted to play back a media item, they would select the media item's play button, and a backend system would attempt to identify the best server to provide the requested media item. In this process, the backend system would use factors including latency, proximity, bit rate, content availability, etc., to choose the best server. If, for some reason, the best server identified was not available, the system would send the user's media item request to an alternative server instead. The backend system would make this determination of which server was best suited to handle the user's media item request each time a request was received by the backend system. This often resulted in many thousands of such lookups being performed for each incoming media item request.

Moreover, regardless of how the various server nodes are identified as being good candidates to provide a requested media item, once the server nodes have been identified, conventional systems have been designed to steer media item requests to specific nodes to increase efficiency (e.g., to ensure full utilization, to provide faster download speeds, to favor certain servers that have faster hard drives or higher network bandwidth, etc.). In such systems, when multiple servers are available for a given media item request, conventional systems would use a random distribution algorithm to spread the requests over the available server nodes. If some nodes were becoming overloaded, the system would skew the random distribution by weighting the distribution algorithm toward certain server nodes. As such, the request distribution algorithm would need to be constantly changed and skewed to ensure that the media item requests were being handled by server nodes that had capacity to serve the data.

SUMMARY

As will be described in greater detail below, the present disclosure describes systems and methods for pre-calculating server node rankings and instructing specific ranked server nodes to satisfy media item requests. The present disclosure also describes systems and methods for steering media item requests according to a directed distribution.

In one example, a computer-implemented method for pre-calculating server node rankings and servicing media item requests using those ranked server nodes includes determining, for a set of electronic devices, which server nodes are capable of providing media items to that set of electronic devices. The method next includes pre-calculating, from the determined server nodes, a server node ranking that ranks the server nodes' ability to provide the media items to the set of electronic devices according to various media item provisioning factors. The method further includes receiving a request indicating that a media item is to be provided to a specific electronic device among the set of electronic devices. The method then includes accessing the precalculated server node ranking for the set of electronic devices, and instructing a specified optimal server node, according to the precalculated server node ranking, to provide the media item to the specified electronic device.

In some embodiments, the server nodes are part of certain specified server clusters. In some cases, the server node ranking is extended to include rankings for other server clusters based on at least one of the media item provisioning factors. In some examples, the media item provisioning factors include proximity, cost, geography, server node health, popularity, server node processing hardware, and/or server node networking hardware.

In some embodiments, the specified electronic device is identified as being part of the set of electronic devices based on an associated identifier. In some cases, the associated identifier of the specified electronic device is an internet protocol (IP) address. In some examples, the IP address of the specified electronic device is part of a classless inter-domain routing (CIDR) block of IP addresses. In some cases, the set of electronic devices for which server nodes are capable of providing media items is represented by the CIDR block. In some embodiments, the precalculated server node ranking ranks each of the server nodes who service IP addresses in each CIDR block.

In some examples, the specified optimal server node is the highest ranked server node in the precalculated server node ranking. In some cases, the precalculated server node ranking is provided to multiple different server nodes. In some cases, the precalculated server node ranking is compressed prior to transfer to the server nodes. In some examples, the system further determines that rankings have changed for at least some of the server nodes based on the provisioning factors. The system then propagates the rankings changes for those server nodes, such that the precalculated server node ranking is updated using only the rankings changes for those server nodes.

In some embodiments, the system further instructs the specified optimal server node to establish a peer-to-peer connection with other server nodes to fill media content from those nodes in a peer-to-peer fashion. In some cases, the server nodes that have specified rankings in the precalculated server node ranking are selected to provide the media item to the specified electronic device according to various established policies. In some examples, the system further validates network routes between the specified electronic device and at least some of the server nodes to ensure that the network routes provide a threshold level of data transfer. In some embodiments, the system further filters network routes between the specified electronic device and at least some of the server nodes to prevent erroneous routes or routes to malicious server nodes. In some examples, the system further steers subsequent media item requests to the specified optimal server node as determined by the ranking.

In addition, a corresponding system includes at least one physical processor and physical memory comprising computer-executable instructions that, when executed by the physical processor, cause the physical processor to: determine, for a set of electronic devices, which server nodes are capable of providing media items to the set of electronic devices, pre-calculate, from the determined server nodes, a server node ranking that ranks the server nodes' ability to provide the media items to the set of electronic devices according to one or more media item provisioning factors, receive a request indicating that a media item is to be provided to a specific electronic device among the set of electronic devices, access the precalculated server node ranking for the set of electronic devices, and instruct a specified optimal server node, according to the precalculated server node ranking, to provide the media item to the specified electronic device.

In some examples, the above-described method is encoded as computer-readable instructions on a computer-readable medium. For example, a computer-readable medium may include one or more computer-executable instructions that, when executed by at least one processor of a computing device, cause the computing device to: determine, for a set of electronic devices, which server nodes are capable of providing media items to the set of electronic devices, pre-calculate, from the determined server nodes, a server node ranking that ranks the server nodes' ability to provide the media items to the set of electronic devices according to one or more media item provisioning factors, receive a request indicating that a media item is to be provided to a specific electronic device among the set of electronic devices, access the precalculated server node ranking for the set of electronic devices, and instruct a specified optimal server node, according to the precalculated server node ranking, to provide the media item to the specified electronic device.

In another embodiment, a computer-implemented method for steering media item requests according to a directed distribution includes determining that incoming media item requests are to be skewed from a random distribution among server nodes, that uses a random distribution algorithm, to a directed distribution among the server nodes. The method also includes identifying, in a loading assignment, which of a plurality of media items are to be loaded onto specific server nodes to produce the directed distribution of media item requests. The method next includes preloading the identified media items onto the server nodes according to the loading assignment and receiving media item requests for the preloaded media items. The method further includes routing the received media item requests to the server nodes using the random distribution algorithm, where the random distribution algorithm is skewed to the directed distribution based on the preloading of the media items according to the identified loading assignment.

In some cases, the method further includes determining various request servicing capabilities of the server nodes. In some examples, identifying the loading assignment includes, as a factor, the request servicing capabilities of the server nodes. In some embodiments, the request servicing capabilities of the server nodes include processing capabilities, networking capabilities, data storage capabilities, current operating health, and/or current resource utilization. In some cases, the data storage capabilities used when identifying the loading assignment include an indication of each server node's data storage hardware. In some embodiments, server nodes that have an increased amount of higher-tier (e.g., solid-state) storage are assigned a loading assignment that receives an increased number of media item requests.

In some embodiments, the networking capabilities used when identifying the loading assignment include an indication of each server node's networking hardware and/or the server node's networking connectivity or configuration. In some cases, server nodes that have an increased amount of networking bandwidth are assigned a loading assignment that receives an increased number of media item requests. In some embodiments, the processing capabilities used when identifying the loading assignment include an indication of each server node's processing hardware. In some cases, server nodes that have an increased amount of processing bandwidth are assigned a loading assignment that receives an increased number of media item requests. In some embodiments, server nodes that have an increased amount of current operating health are assigned a loading assignment that receives an increased number of media item requests.

In some cases, server nodes that have a decreased amount of current resource utilization are assigned a loading assignment that receives an increased number of media item requests. In some examples, identifying the loading assignment includes, as a factor, different capabilities of a client device from which the media item requests were received. In some cases, the capabilities of the client device include a decoder type, a device type, a screen resolution, an indication of processing resources, an indication of networking hardware, or an indication of data storage capacity of the client device.

In some cases, server nodes that provide media items encoded for a specific device type are assigned a loading assignment that receives an increased number of media item requests. In some embodiments, server nodes that provide specific media items encoded for client devices having less than a threshold level of processing resources are assigned a loading assignment that receives media item requests for those client devices that have less than the threshold level of processing resources. In some embodiments, server nodes that have provided specific media items in the past are assigned a loading assignment that receives an increased number of media item requests for contextually similar media items. Still further, in some examples, server nodes that are predicted to receive an increased number of media item requests for specific media items are assigned a loading assignment to provide those specific media items.

In addition, a corresponding system includes at least one physical processor and physical memory comprising computer-executable instructions that, when executed by the physical processor, cause the physical processor to: determine that incoming media item requests are to be skewed from a random distribution among server nodes, that uses a random distribution algorithm, to a directed distribution among the server nodes, identify, in a loading assignment, which of a plurality of media items are to be loaded onto specific server nodes to produce the directed distribution of media item requests, preload the identified media items onto the server nodes according to the loading assignment, receive media item requests for the preloaded media items, and route the received media item requests to the server nodes using the random distribution algorithm, where the random distribution algorithm is skewed to the directed distribution based on the preloading of the media items according to the identified loading assignment.

In some examples, the above-described method is encoded as computer-readable instructions on a computer-readable medium. For example, a computer-readable medium may include one or more computer-executable instructions that, when executed by at least one processor of a computing device, cause the computing device to: determine that incoming media item requests are to be skewed from a random distribution among server nodes, that uses a random distribution algorithm, to a directed distribution among the server nodes, identify, in a loading assignment, which of a plurality of media items are to be loaded onto specific server nodes to produce the directed distribution of media item requests, preload the identified media items onto the server nodes according to the loading assignment, receive media item requests for the preloaded media items, and route the received media item requests to the server nodes using the random distribution algorithm, where the random distribution algorithm is skewed to the directed distribution based on the preloading of the media items according to the identified loading assignment.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 8 illustrates an embodiment in which multiple server clusters are ranked at different levels.

FIG. 9A illustrates an embodiment in which different server nodes are assigned to different CIDR blocks.

FIG. 9B illustrates an embodiment of a precalculated server node ranking update.

Figure 1:
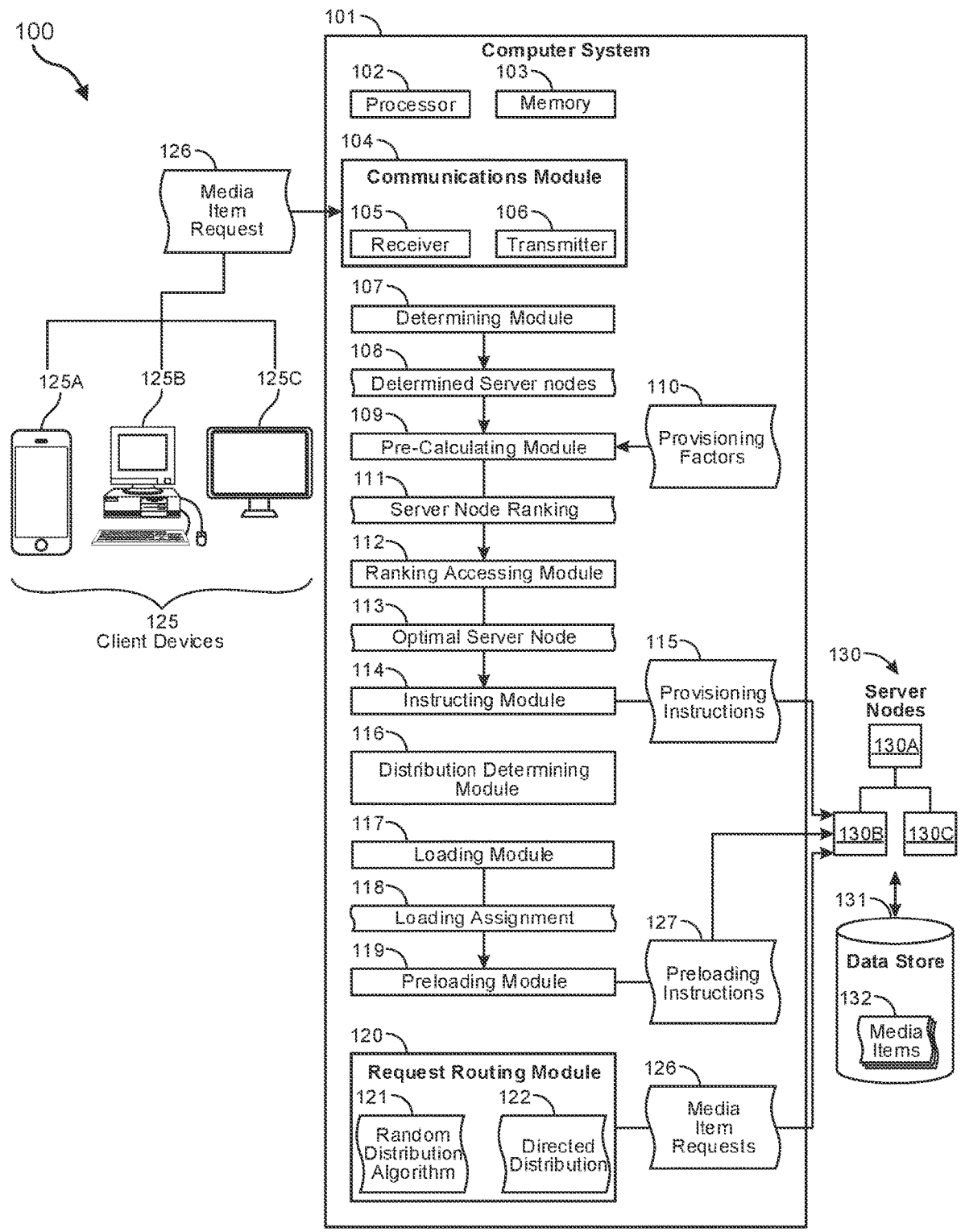
FIG. 1 illustrates a computing environment in which server node rankings are precalculated and in which media item requests are steered according to a directed distribution.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to pre-calculating server node rankings and instructing specific ranked server nodes to satisfy media item requests. Other embodiments of the present disclosure further provide systems and methods for steering media item requests according to a directed distribution. In some examples, the precalculated server node ranking is used when steering media item requests according to the directed distribution.

In the past, when users attempted to play back a media item on an electronic device, those users would open an application and select the media item's play button. Upon selecting the play button (or potentially while attempting to prefetch media content), the application would send a signal to a backend system to provide the requested media item. The backend system would then attempt to identify the best server to provide the requested media item. In this process, the backend system would use various factors including latency, proximity, bit rate, content availability, network connectivity, server health, monetary cost, etc., to choose the best server to provide the requested media item. If, for some reason, the server identified as being the most suited to provide the requested media item was not available, the backend system would send the user's media item request to an alternative server instead.

In such scenarios, the backend system would make the determination as to which server was best suited to handle the user's request each time a request would come in. Such systems would first determine which server nodes were able to "see" or communicate with the block of internet protocol (IP) addresses that included the requesting user's IP address (or, more specifically, the IP address of the electronic device the user was implementing to request the media item). Next, these systems would determine the cost (e.g., based on at least some of the factors identified above including latency, proximity, bit rate, etc.) for each of those server nodes to provide the requested media item, and would then select the server node with the lowest cost. This process, however, resulted in thousands of server lookups being performed on each incoming media item request. As such, this process was highly resource intensive, consuming both processing resources including central processing unit (CPU) and memory resources, as well as network bandwidth used to communicate with the multitude of different server nodes.

In contrast, the embodiments of the present disclosure predetermine which server nodes can see which IP addresses or ranges of IP addresses referred to as "CIDR blocks." This predetermination may occur before receiving any media item requests. The embodiments described herein then pre-calculate a ranking of those server nodes that can see each range of IP addresses (e.g., each CIDR block) based on cost and other factors. The pre-calculated ranking is then stored and distributed to the various server nodes in a cluster or group of clusters. Then, instead of performing hundreds, thousands, or tens of thousands of lookups each time a media item request is received, the systems herein access the pre-calculated ranking and select the optimal server node based on this precalculated ranking. The selected server node then provides the requested media item to the requesting user's device.

This pre-calculation process greatly reduces the number of lookups that occur when a media item request comes in, significantly reducing processing resources and network bandwidth used upon receiving a request. Moreover, these precalculated rankings allow the list of ranked nodes to be compressed prior to distribution among the server nodes of a cluster. This compression greatly reduces the routing information used by the collective server nodes from multiple gigabytes of data to hundreds of megabytes or less, a 10-100-fold reduction in storage space. Still further, the precalculated server node ranking allows for small, incremental changes to be made to the pre-calculated list without having to transmit a full new set of routing information over the network. Additionally, this pre-calculation may be performed prior to performing any type of content steering; however, as will be shown below, the precalculated ranked list of server nodes may also be used in conjunction with the steering of requests to specific server nodes to effect a controlled, directed distribution.

Indeed, the embodiments described herein are designed to steer content to specific nodes (e.g., nodes on the precalculated list of server nodes) to increase efficiency (e.g., to ensure full utilization among server nodes, to provide faster download speeds, to favor servers with faster hard drives or more network bandwidth, etc.). In other systems, when multiple server nodes were available to service a given request, backend systems would use a random distribution algorithm to spread the requests over the available nodes. Thus, for instance, when a media item request was received at the backend systems, these systems would apply a random distribution algorithm to randomly assign that request to an available server node. That server node would then provide the requested media item to the requesting user.

In some cases, over time, one or more of the server nodes in these backend systems would become overloaded and would end up servicing a disproportionate number of media item requests. To compensate for this overloading, these backend systems would attempt to skew the random distribution created using the random distribution algorithm by weighting the algorithm toward certain servers. Thus, instead of the random distribution algorithm being truly random, server cluster managers or other users would attempt to manually modify the random distribution algorithm by adding weights that would ensure that some servers received more media item requests than others. Such skewing of the random distribution required constant updating and fine-tuning by the server cluster managers to ensure that the skewed distribution did not overload any of the server nodes to which the distribution of requests was skewed.

In contrast, the embodiments of the present disclosure steer media item requests to certain servers, but while making only minimal changes to the random distribution algorithm or, at least in some cases, without making any changes to the random distribution algorithm. Indeed, the embodiments described herein provide a controlled, directed distribution that favors certain servers (e.g., servers with large amounts of solid-state or other high-tier data storage) while still using a random distribution algorithm. The systems described herein achieve such a directed distribution by loading media items (or other content) on the server nodes in a specific manner. For example, in some cases, the systems described herein place more popular content on server nodes that have an increased amount of high-tier (e.g., solid-state) storage and, potentially, an increased number of high-speed network adapters. Such server nodes are more capable of handling the higher amounts of media item requests that are attendant with more popular media items. In the examples herein, high-tier storage may refer to substantially any data type of data storage that accesses and/or stores data faster than hard disks, while low-tier storage may refer to hard disks or any data storage type that accesses and/or stores data slower than or equal to the speed of hard disks.

In contrast, less popular media items are stored on server nodes that have an increased amount of hard disk space (to store a larger number of less popular titles) and potentially less network bandwidth (to service the reduced number of media item requests). As such, even when using a random distribution algorithm, the embodiments herein produce a skewed but directed distribution, where more requests are ultimately sent to specific nodes because of where the media item content is initially loaded. This, as will be explained in greater detail below, substantially reduces or eliminates any need for a server cluster manager to make changes to a random distribution algorithm, and still steers media item requests to those server nodes that are best able to provide the requested content.

The following will provide, with reference to FIGS. 1-19, detailed descriptions of the various tables, illustrations, and flow diagrams. FIG. 1, for example, illustrates a computing environment 100 in which server node rankings are precalculated, and in which media item requests are steered according to a directed distribution. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes a determining module 107. The determining module 107 is configured to determine which server nodes are capable of providing media items to a specified set of electronic devices. For example, client devices 125 may include multiple different client devices including a smartphone 125A, a personal computer 125B, and a television 125C. Although client devices 125A-C are shown in FIG. 1, it will be recognized that the set of client devices 125 may include substantially any type of electronic client devices and substantially any number of client devices. Each of these client devices 125 is configured to send media item requests 126 (or other data requests) to computer system 101. The media item request 126 seeks to initiate playback for one or more media items including movies, songs, video clips, audiobooks, video games, or other audiovisual items. From these client devices 125, the determining module 107 of computer system 101 determines which server nodes (e.g., 130A, 130B, 130C, etc. from server cluster 130) are capable of providing media items to 132 to each client device. This determination may be made in a variety of ways, as will be explained further below.

Once the determining module 107 has determined which server nodes 108 are capable of providing media items 132 to the client device(s), the pre-calculating module 109 of computer system precalculates a server node ranking 111 that ranks the server nodes' 108 ability to provide the media items 132 to the set of electronic devices 125 according to one or more media item provisioning factors 110. These media item provisioning factors 110 may include proximity, cost, geography, node health, popularity, processing hardware, networking hardware, and/or other factors, as outlined further below with regard to FIG. 6. Upon receiving a request 126 indicating that a media item 132 is to be provided to a specific electronic device (e.g., 125A) among the set of electronic devices 125, the ranking accessing module 112 of computer system 101 accesses the precalculated server node ranking 111 for the set of electronic devices to select a server node that is optimally suited to provide the requested media items 132, after which the instructing module 114 of computer system 101 instructs the determined optimal server node (e.g., one of server nodes 130A-130C, or potentially a server node from another cluster), according to the precalculated server node ranking 111, to provide the requested media item to the electronic device 125. This process will be described further below with regard to FIGS. 2-10.

Still further, in another embodiment, the distribution determining module 116 determines that one or more incoming media item requests 132 are to be skewed from a random distribution among server nodes 130 (using a random distribution algorithm), to a directed distribution among the server nodes that skews distribution of requests in a directed, controlled manner by placing media items 132 and other content according to a specific placement scheme. In one example, the loading module 117 of computer system 101 identifies, in a loading assignment 118, which of a plurality of media items 132 are to be loaded onto specific server nodes (e.g., 130A-130C) to produce the directed distribution of media item requests. This directed distribution skews incoming media requests (e.g., 126) without modifying any random distribution algorithms that are implemented in the process. Rather, the preloading module 119 of computer system 101 preloads the identified media items 132 onto the server nodes 130 according to the loading assignment 118 and receives media item requests for the preloaded media items. The request routing module 120 of computer system 101 then routes the received media item requests 126 to the server nodes 130A-130C using the random distribution algorithm 121; however, this random distribution algorithm 121 is skewed to the directed (i.e., designed) distribution 122 based on the preloading of the media items according to the identified loading assignment 118. This process will be described in further detail below with regard to FIGS. 11-16.

Figure 2:
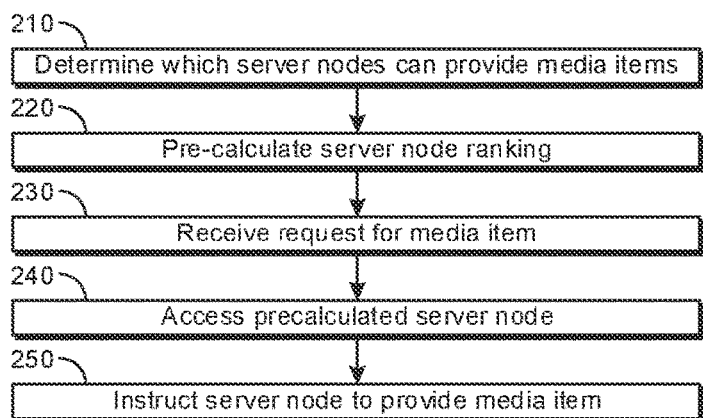
FIG. 2 illustrates a flow diagram of an exemplary method for pre-calculating server node rankings and instructing ranked servers to satisfy media item requests.

Turning now to FIG. 2, FIG. 2 is a flow diagram of an exemplary computer-implemented method 200 for pre-calculating server node rankings and instructing ranked servers to satisfy media item requests. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein determines, for a set of electronic devices 125, which server nodes (e.g., 130A-C) are capable of providing media items 132 to that set of electronic devices. As noted above, the set of electronic devices 125 may include substantially any number or type of electronic client devices including smartphones (125A), personal computers (125B), televisions (125C), laptops, tablets, smartwatches, artificial reality devices (including augmented reality, virtual reality devices, etc.), or other electronic devices capable of playing back media items. Similarly, the server nodes 130 may include substantially any number of server nodes or types of server nodes. These server nodes 130 may be located in the same general area (e.g., in a single server room), or may be spread across many different locations all over the globe. Each server node may have its own data storage, or may have access to a data store 131 which, itself, may be local or may be geographically dispersed across many different storage nodes or clusters in different locations.

Thus, the determining module 107 is configured to determine, for substantially any client device, which server node, regardless of type or location, is capable of providing a requested media item 132 to the client device. In some cases, multiple server nodes 130 are capable of providing the requested media item, meaning that those server nodes have access to the requested media item and a network connection that can see the client device. The pre-calculating module 109 of computer system 101 then calculates, at step 220, from the server nodes 108 that are capable of providing the requested media item, a server node ranking 111 that ranks the server nodes' 108 ability to provide the media items 132 to the electronic device(s) according to various media item provisioning factors 110.

When determining a ranking for different server nodes, at least some of the embodiments described herein consider the popularity of the requested media item 132 as a factor. Indeed, some media items are more popular than others (at least initially) and, in a given system, the most popular media items (e.g., "Popular Title A" or "Popular Title B" in chart 300 of FIG. 3) have the highest corresponding number of bytes streamed 301. Conversely, less popular titles (e.g., "Unpopular Title C" and "Unpopular Title D") draw a much smaller number of bytes streamed, as indicated by the content rank 302. Furthermore, as shown in the example chart 400 of FIG. 4, a large majority of data requests 401 are serviceable by a relatively small amount of data 402. This is because a relatively small portion of highly requested titles uses a relatively small amount of disk space, with the remainder of the available disk space being used for less popular titles. The streaming of these unpopular titles registers low on the total percentage of bytes served to clients. Thus, at least in some cases, the pre-calculating module 109 takes into account the popularity or content ranking of the requested media item, and/or the relative amount of traffic used to provide the requested media item 132.

Figure 5:
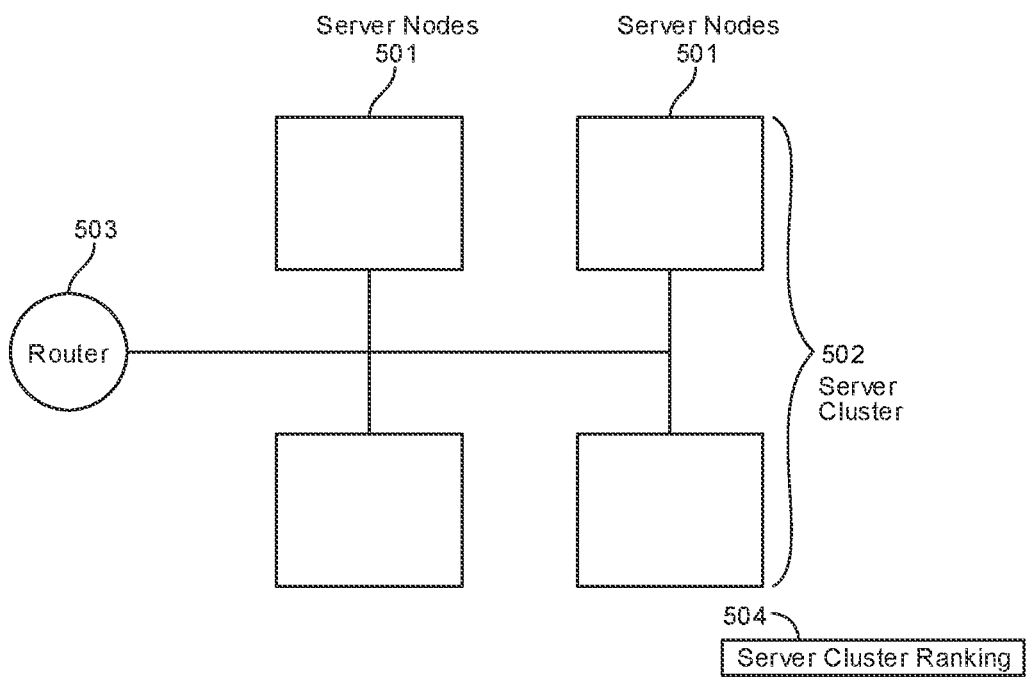
FIG. 5 illustrates an embodiment of a router and multiple server nodes that make up a server cluster.

Each server cluster is made up of different server nodes. Each of these server nodes may have different processing hardware, different networking hardware, different data storage capabilities, or other differences. This may also be taken into account when pre-calculating server node rankings. As shown in FIG. 5, server cluster 502 may include multiple nodes 501 that are connected to a router 503 or other networking hardware that allows the cluster to receive media item requests, access those media items, and provide the requested media items to the client devices. Each server cluster 502 has a server cluster ranking 504 that is used when determining which server node is best suited to service a client request. The server cluster ranking 504 may apply to the server cluster as a whole, or, the server cluster ranking may include multiple specific rankings for each server node 501 in that cluster. As noted above, each server node within a cluster may have different hardware from the other server nodes. Or, in other cases, each server node in a cluster may have the same hardware, including potentially networking hardware, processing hardware, and/or storage hardware. Thus, the server cluster ranking 504 may be granular and may include multiple levels and rankings at each level. In such cases, these levels may include an overall ranking that applies to the entire server cluster 504, as well as individual rankings for individual server nodes 501.

Figure 3:
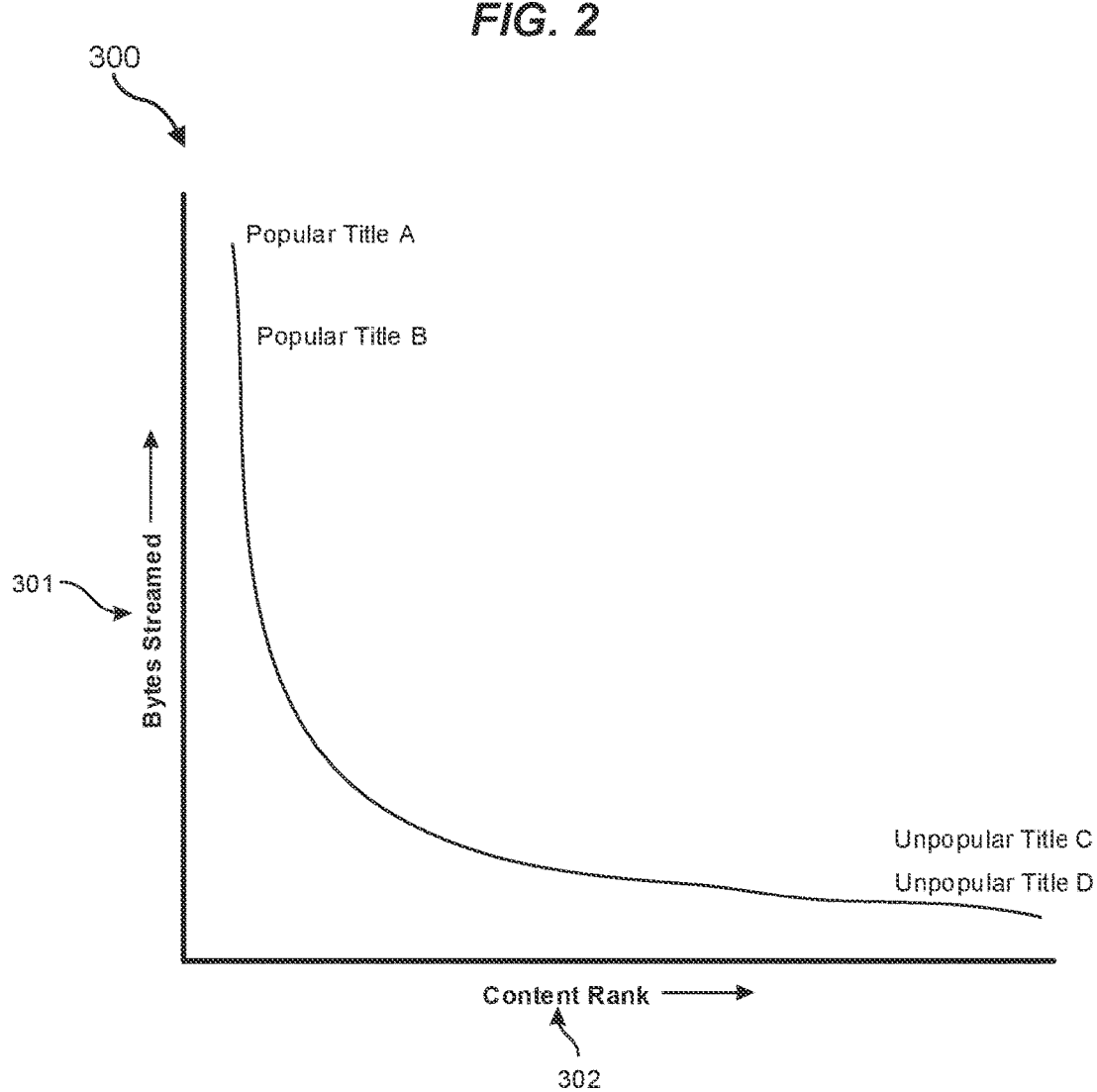
FIG. 3 illustrates a chart showing a distribution of bytes streamed versus content rank.
Figure 6:
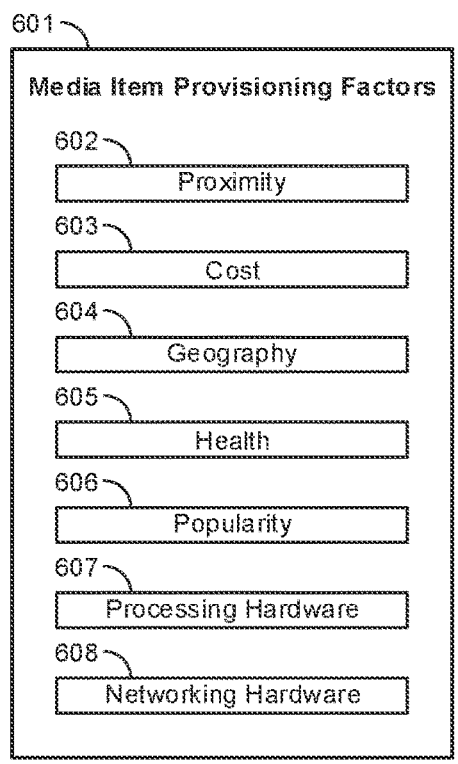
FIG. 6 illustrates an embodiment showing a plurality of example media item provisioning factors.

In some embodiments, the pre-calculating module 109 of computer system 101 of FIG. 1 generates the various levels of server cluster rankings 111 according to media item provisioning factors including factors relating to the requested media item itself (e.g., popularity, as shown in FIG. 3), and/or factors related to the server nodes or server clusters. At least some of these factors are outlined in FIG. 6. As shown in FIG. 6, media item provisioning factors 601 include, but are not limited to, proximity 602, cost 603, geography 604, health 605, popularity 606, processing hardware 607, and/or networking hardware 608.

Proximity 602 refers to the server cluster's (or server node's) physical distance to the requesting client device. This may include a literal physical distance, or may include a number of hops between networking nodes. In such cases, a closer physical distance, or a lower number of hops between networking nodes is optimal. At least in some cases, cost 603 refers to the monetary cost of a connection. In some cases, for example, internet service providers (ISPs) make deals with content providers and charge less for certain connections (e.g., charge a lower per/byte transfer rate). In such cases, cost 603 refers to the actual monetary amount (e.g., dollar amount) that it will cost to transfer the data bytes of the media item from the server node to the client device. In other cases, cost 603 refers to non-monetary costs including network management factors. These network management factors may include available bandwidth, expected congestion during peak traffic, latency, or balancing traffic between two or more different network paths.

Geography 604 refers to city, county, country, or state lines that may be crossed during the transfer of the media item to the requesting media device. Geography also refers to the location of the client device, the location of cell towers or other wireless or wired networking hardware that lies between the servicing node and the client device. Any of these geographical features may affect how data is transferred between server and client, and more geographically optimal servers will be ranked higher in the ranking. Still further, health 605 refers to the health of the server nodes 130 (or 501 of FIG. 5). Each server node at any given moment in time may have more or less networking bandwidth available, may have more or less processing bandwidth available (e.g., CPU cycles, CPU cores, RAM, etc.), more or less data storage available, may be operating in an environment that is too hot or too cold, may have hardware that has stopped functioning properly, may have a power outage, or may experience hardware failures or other occurrences that affect its health. These are taken into account by the pre-calculating module 109.

Figure 4:
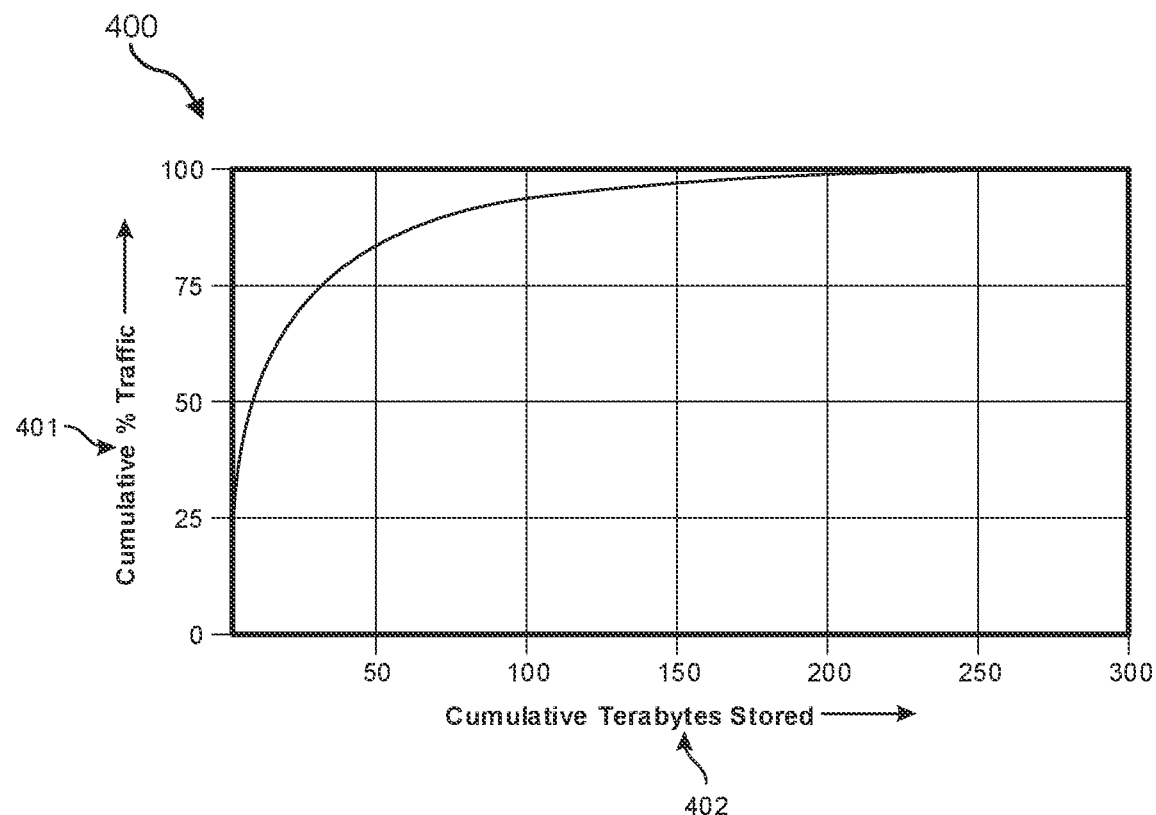
FIG. 4 illustrates a chart showing cumulative percentage of traffic versus cumulative bytes stored on a media server.

Moreover, at least in some cases, as highlighted above in FIGS. 3 & 4, the pre-calculating module 109 considers the popularity 606 of the media item being requested based on the number of past requests for the media item or based on projected future requests for the media item. Other factors 601 indicate which types of processing hardware 607 are available including CPU types, number of CPU cores, number of machine learning cores or chips, amount of RAM available, etc., as well as networking hardware 608 including types and numbers of wired and wireless network adapters available, routers, firewalls, and other networking equipment. The pre-calculating module 109 may use any or all of these factors 601 (or others) when determining the server node ranking 111 for the server cluster as a whole or for each individual server node in the cluster.

Returning to FIG. 2, the method 200 further includes, at step 230, receiving a request 126 indicating that a media item 132 is to be provided to a specific electronic device (e.g., 125B) among the set of electronic devices 125. The method 200 then includes, at step 240, accessing the pre-calculated server node ranking 111 for the set of electronic devices 125 and, at step 250, instructing a specified optimal server node 113 (using provisioning instructions 115), according to the precalculated server node ranking 111, to provide the media item 132 to the specified electronic device (e.g., 125B). It should be noted that this precalculated server node ranking 111 is, at least in some cases, calculated before receiving media item requests, or at least before receiving requests for a media item that is yet to be loaded onto the data store 131. As such, instead of having to perform many hundreds or thousands of lookups to determine a suitable node to provide a requested media item, the systems herein have already precalculated which server nodes would be best suited to provide a specific media item to a specific client device or set of client devices.

Figure 7:
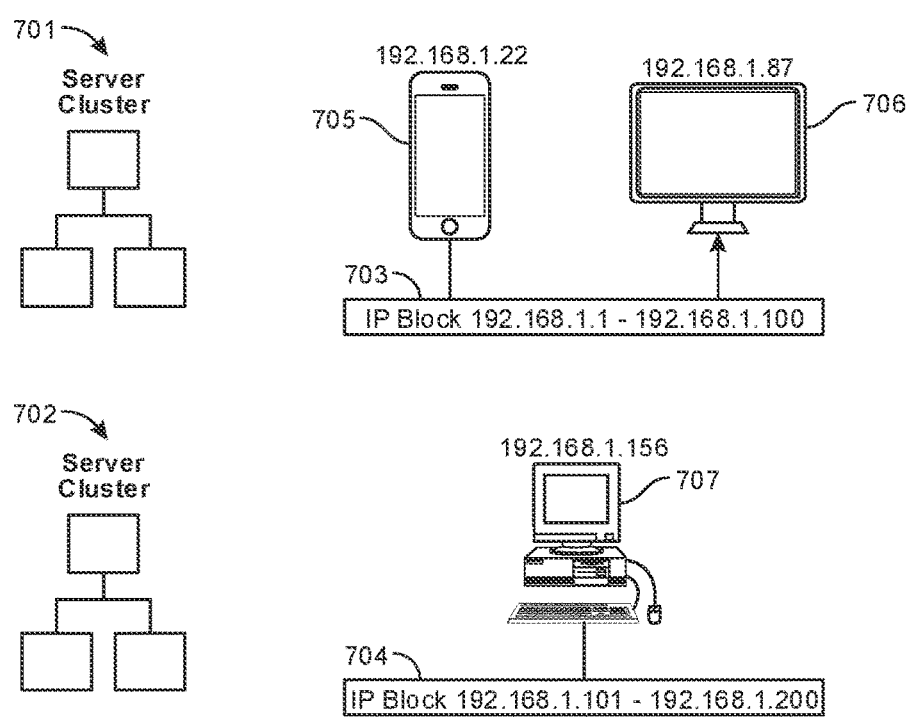
FIG. 7 illustrates an embodiment showing which server clusters are assigned to provide media items to which client devices.

Indeed, in some cases, the electronic device that sent the media item request 126 is identified as being part of a specific set of electronic devices. For example, client device 125C is part of the set of client devices 125. In some examples, computer system 101 determines that the client device 125C is part of the set of client devices 125 based on an associated identifier. In some cases, the associated identifier of that specific electronic device is an internet protocol (IP) address. Each of the client devices 125A-125C has its own IP address identifier. That IP address may be part of a classless inter-domain routing (CIDR) block of IP addresses. As shown in FIG. 7, for example, client device 705 is part of IP CIDR block 703, which has IP addresses ranging from 192.168.1.1-192.168.1.100 (chosen arbitrarily for this example). Client device 706, which also has an IP address within this range (192.168.1.87), is also part of CIDR block 703. While the CIDR block of this example has 100 IP addresses, it will be understood that CIDR blocks or other identifier groupings (e.g., groupings of media access control (MAC) addresses) may have more or fewer IP addresses or other identifiers. In this example, server cluster 701 is configured to provide services to the client devices of IP block 703. This means that server cluster 701 can physically connect to client devices 705 and 706 over wired or wireless network connections. As such, if server cluster 701 has the media item requested by client device 705 or client device 706, a node from server cluster 701 will provide that media item.

Other client devices may be part of different IP CIDR blocks. For example, client device 707 is part of IP block 704, which has a different range of IP addresses. At least in some cases, server cluster 701 may not be able to provide services to the devices of IP block 704. In this example, however, server cluster 702 can see the devices of IP block 704. Thus, the embodiments described herein may determine, for each CIDR block of IP addresses, which server clusters are physically able to communicate with the devices in that range of IP addresses. For those server clusters that can communicate with those devices, the pre-calculating module 109 of computer system 101 ranks those server nodes according to one or more of the provisioning factors 110. Then, when a media item request comes in from a client device in a given CIDR block (e.g., 703), the ranking accessing module 112 may simply access the server node ranking 111 for server clusters that can see that CIDR block, and select the optimal server node 113 from within the ranked list of server nodes.

Accordingly, because not every server cluster can see or communicate with devices from every CIDR block, the embodiments herein may omit some servers from the ranked list of server nodes. In some cases, for example, the precalculated server node ranking 111 ranks each of the server nodes who service IP addresses in each CIDR block of IPs. As such, ranked lists of server nodes may be CIDR block-specific and, at least in some cases, may only include server nodes that are capable of communicating with client devices having IP addresses in those CIDR blocks. In such cases, other server nodes that cannot communicate with those client devices are omitted from the ranked list of servers. This further reduces the size of the ranked list of servers (e.g., 111), thereby reducing disk space usage and also reducing network bandwidth used to transmit the ranked list of server nodes among the various server nodes and/or server clusters.

In some embodiments, the optimal server node 113 selected by the ranking accessing module is the highest ranked server node in the precalculated server node ranking 111. For example, in some embodiments, the pre-calculating module 109 considers one or perhaps many of the provisioning factors 110 for each server node in a server cluster. Or, in other cases, as shown in FIG. 8, the pre-calculating module 109 of FIG. 1 considers the provisioning factors 110 for each server cluster in an environment that has multiple server clusters. In the latter case, the pre-calculating module 109 ranks the various server clusters (e.g., 804 and 805), potentially using path length, median cost, and geography as factors, for example. In such a case, the server clusters are ranked as being in three different categories: PR0 (801), PR1 (802), and PRN (803). Thus, server clusters within category PR0 or PR1 may share the same ranking. In other cases, the server clusters are ranked within each category, such that server cluster 804 may rank above server cluster 805, even though both clusters are within category PR0. Similar rankings may be generated for individual server nodes within server clusters.

In some embodiments, the rankings generated by pre-calculating module 109 are generated per CIDR block. As shown in FIG. 9A, for example, each CIDR block (as identified by block ID 910) may have its own corresponding ranking 911. For instance, in the embodiment shown in FIG. 9A, CIDR block 901 ranks three server nodes as Server C being the best suited to provide media items (or otherwise service) the client devices belonging to that CIDR block, then server A, then server B. For CIDR block 902, the pre-calculating module 109 determines, based on one or more of the provisioning factors 110, that server node D is best suited to service the devices of CIDR block 902, followed by server node F, then node G, then node E. Similarly, for CIDR block 903, the server nodes are ranked as server node B being the optimal node, followed by node D and then node H. Of note in this CIDR block, server nodes B and D are also capable of servicing CIDR blocks 901 and 902, respectively. As such, each ranking 911 may include server nodes that are capable of servicing client devices in multiple CIDR blocks. The pre-calculating module 109 may also pre-calculate rankings for other CIDR blocks n (904) and store those rankings in the server node (or cluster) ranking 111. The computer system 101 then shares this server node ranking with other server clusters and nodes. In this manner, each server node, instead of needing to perform a lookup when a client request comes in, can simply refer to the precalculated server node ranking 111 and use that ranking to determine which server node is optimal to provide the requested media item.

In some cases, the precalculated server node ranking 111 is compressed prior to transfer to the server nodes. The computer system 101 may use a variety of different compression algorithms when compressing the server node ranking 111. This compression reduces the amount of data that is transmitted to the various server nodes. Computer system 101 also attempts to minimize the amount of data generated and transferred when updating the server node ranking 111. Instead of transmitting a new server node ranking 111 each time a node is added to or removed from a cluster, or each time new hardware is installed on a node, or each time a server node goes down for an extended period of time, the computer system merely determines that rankings have changed for at least some of the server nodes based on the provisioning factors, and then propagates the rankings changes for those server nodes that changed. In this manner, as shown in FIG. 9B, the precalculated server node ranking is updated using only the rankings changes for those server nodes. Thus, the precalculated server node ranking update 905 includes only changes for CIDR block 903, changing the ranking from B, D, H to D, B, H. Such minimal changes reduce the amount of ranking update data transferred between server nodes, and further reduce the amount of computing resources used to process the changes.

Figure 10:
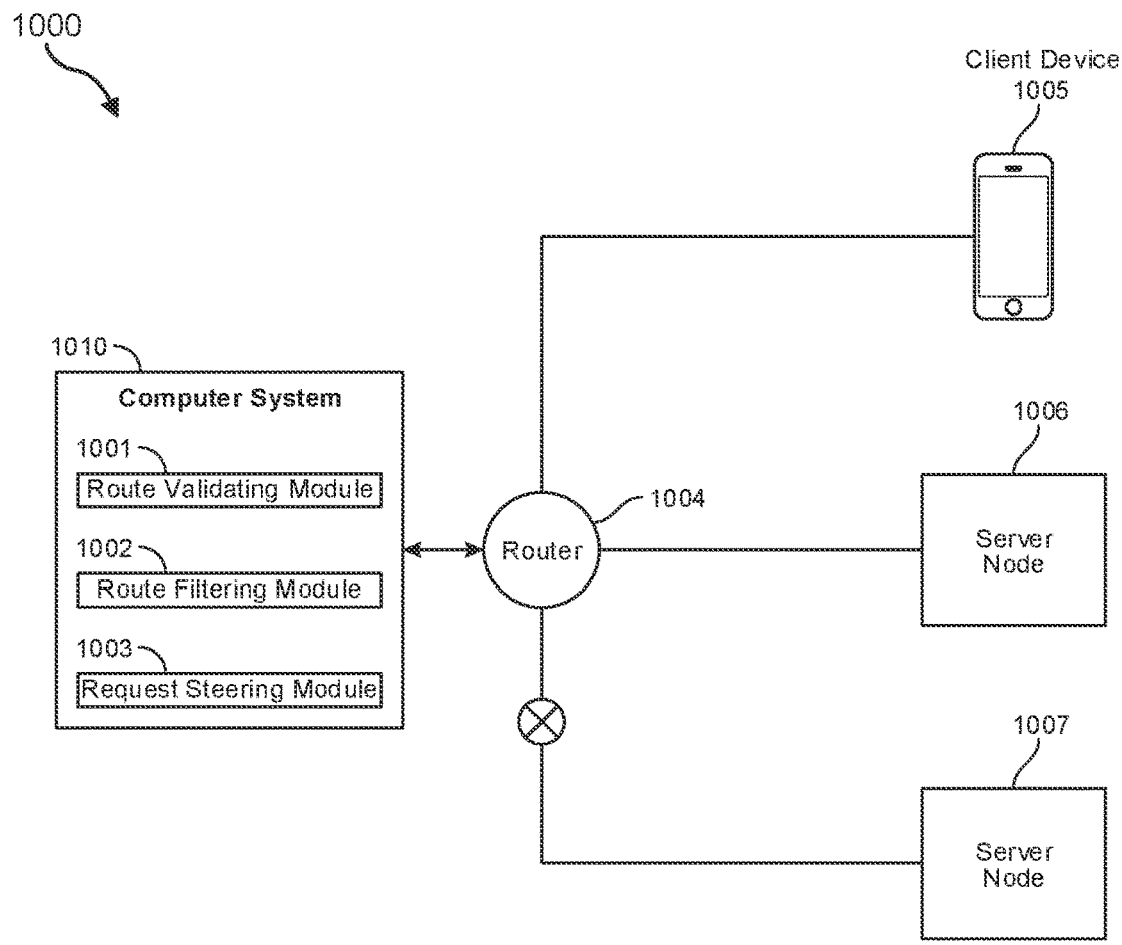
FIG. 10 illustrates an embodiment in which routes are validated and filtered prior to content steering.

In addition to finding a server node that is optimally suited to provide a media item, at least in some embodiments, the server node ranking 111 is used to establish a peer-to-peer connection with one or more other client and/or server nodes. In one example, as shown in FIG. 10, the server node 1006 establishes a connection, through router 1004 (and/or other networking nodes) to client device 1005. In some cases, the server node ranking 111 indicates which server node, among a plurality of different server nodes (e.g., as shown in FIG. 8) is best suited to form a peer-to-peer connection with another server node. The provisioning factors 110 or other factors may be used to determine which server node is best suited to be part of the peer-to-peer connection. Once the connection is established, server nodes may request and receive content from peer nodes in order to fill content on their own storage devices. Still further, once the connection has been established, other server or client nodes may be added to the peer group of server nodes on an ad hoc basis.

In some embodiments, the highest-ranked server node in the server node ranking 111 is not selected as the optimal server node 113. Indeed, the determination of which server node is optimal in any given situation may be overridden by established policies. For instance, for certain client devices (e.g., smartphones or televisions), server nodes that are ranked lower in the server node ranking 111 may be selected. In some cases, for example, client devices request certain server nodes. In such cases, the requested server node is used above the highest-ranked node. In other cases, policies indicate that for television clients, for example, server nodes having a media item with a specific encoding are to be selected above other, perhaps higher-ranked, server nodes. Still further, policies might indicate that, for specific client devices, only wireless connections are to be used. As such, even if a specific, highest-ranked server is selected from the server node ranking 111, that selection may be overridden if that specific server node is connected at some point via a wired connection. At least in some cases, these policies are defined by end users of client devices. In other cases, the policies are defined by network administrators or information technology managers.

Computing environment 1000 of FIG. 10 further illustrates an example in which the computer system 1010 is implemented to validate network routes between the client device 1005 and at least some of the server nodes 1006/1007. This validation attempts to ensure that the network routes provide a threshold level of data transfer. In some cases, computer networks, or individual server nodes, or even clusters of nodes go down from time to time. These nodes are often down for an indeterminate amount of time. Accordingly, in at least some embodiments, the route validating module 1001 of computer system 1010 is configured to validate networking routes through router 1004 and/or other networking hardware. In some cases, this validation process attempts to ensure that a minimum bitrate can be established between the client device 1005 and the server nodes 1006 and/or 1007. In some embodiments, if the route validating module 1001 determines that a given server node (e.g., 1007) is offline, the route filtering module 1002 filters that network route between the client device and server node 1007. Such filtering prevents erroneous routes or routes that cannot maintain the minimum threshold bitrate from being used. Similarly, the route filtering module 1002 filters routes to known or suspected malicious server nodes. This prevents the client device 1005 from connecting to malicious server nodes that mean to cause some type of harm to the client device or the end user.

Still further, as will be explained further below, the request steering module 1003 of computer system 1010 is used to steer subsequent media item requests to the determined optimal server node according to the server node ranking 111. Thus, when a media item request is received from client device 1005, for example, the computer system 1010 steers the request to a specific server node. In some cases, that server node is the node determined to be optimal according to the server node ranking 111. Other subsequent media item requests may also be steered to the determined optimal node. Such steering may be actively performed by the computer system 1010, to where the request steering module 1003 directly sends incoming media item requests to a specific server node or cluster. In other cases, as will be discussed below with regard to method 1100 of FIG. 11, the request steering module 1003 may load the media items on specific server nodes in a specific manner to skew the distribution of incoming requests according to a directed distribution.

Figure 11:
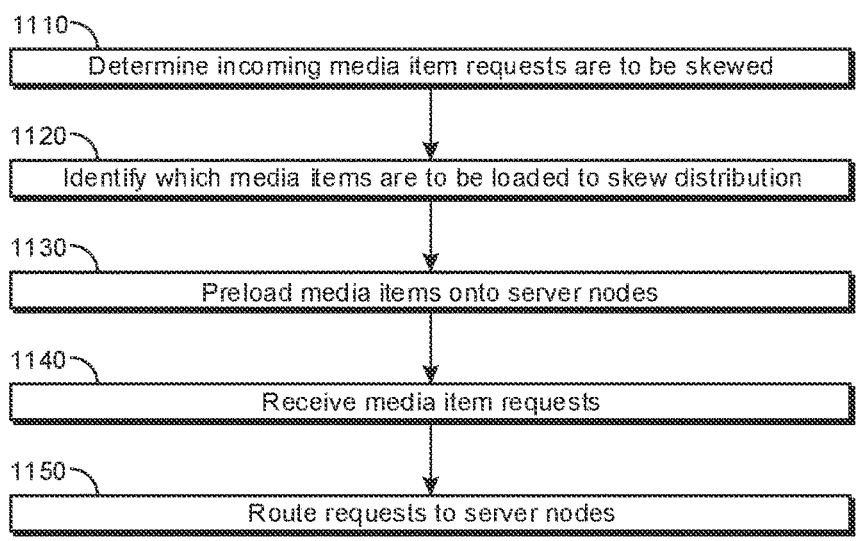
FIG. 11 illustrates a flow diagram of an exemplary method for steering media item requests according to a directed distribution.

Turning now to FIG. 11, FIG. 11 is a flow diagram of an exemplary computer-implemented method 1100 for steering media item requests according to a directed distribution. The steps shown in FIG. 11 may be performed by any suitable computer-executable code and/or computing system, including the system illustrated in FIG. 1. In one example, each of the steps shown in FIG. 11 may represent an algorithm whose structure includes and/or is represented by multiple sub-steps, examples of which will be provided in greater detail below.

As illustrated in FIG. 11, at step 1110, one or more of the systems described herein determines that incoming media item requests are to be skewed from a random distribution among server nodes, using a random distribution algorithm, to a directed distribution among the server nodes. For instance, the distribution determining module 116 of computer system 101 of FIG. 1 determines that incoming media item requests (e.g., 126) are to be skewed from a random distribution using random distribution algorithm 121 to a directed distribution 122 that guides an increased number of incoming media item requests to specific server nodes. The method 1100 next includes, at step 1120, identifying, in a loading assignment, which of a plurality of media items are to be loaded onto specific server nodes to produce the directed distribution of media item requests. For example, in some cases, the loading module 117 of computer system 101 identifies, in loading assignment 118, which of the various media items 132 are to be loaded onto specific server nodes (e.g., 130A-130C) to produce the directed distribution 122 of media item requests.

The preloading module 119 of computer system 101 then preloads, at step 1130, the identified media items onto the server nodes 130A-130C according to the loading assignment 118. The communications module 104 receives media item requests, at step 1140, for the preloaded media items 132, and the request routing module 120 routes the received media item requests 126 to the server nodes 130A-130C, at step 1150, using the random distribution algorithm 121. However, the random distribution algorithm is skewed to the directed distribution 122 based on the preloading of the media items according to the identified loading assignment 118.

As the term is used herein, a "random distribution" refers to a distribution of media item requests or other incoming requests from client devices that uses a random distribution algorithm designed to distribute client requests to server nodes in a random or at least substantially random manner. In a random distribution, one would expect each server node to receive a roughly equal number of media item requests over time. A "skewed distribution," as the term is used herein, refers to a non-randomized distribution that, over time, will favor some server nodes over others. The amount of the skew may be configurable, and the skew may be designed to favor specific server nodes over others. A "directed distribution," as the term is used herein, refers to a skewed distribution that is controlled or directed in some manner.

As noted above, in other systems, a skewed distribution was created by altering the random distribution algorithm by adding weights to the algorithm so that certain servers would receive more traffic than others. In contrast, the embodiments herein produce a skewed, directed distribution without altering the random distribution algorithm 121. Instead, these embodiments control how media items are preloaded onto server nodes, providing, for example, more popular media items on specific servers, while loading less popular content onto other server nodes. Because the more popular media items will inherently receive more client requests (due to their popularity), the random distribution algorithm 121, despite being random, will still send an increased number of incoming requests to those server nodes that have the popular media items because of how the media items are loaded. In this manner, the embodiments herein provide a directed distribution of incoming requests while still implementing a random distribution algorithm 121 to assign the requests to server nodes.

Thus, in method 1100 of FIG. 11, the computer system 101 determines that incoming media item requests are to be skewed according to a directed distribution, identifies how the media items are to be preloaded onto the server nodes (e.g., 130A-130C) to create the directed distribution, preloads the media items onto the server nodes in the identified manner and, upon receiving incoming (media item) requests, routes those requests using the random distribution algorithm 121. Because of how the media items 132 have been preloaded, however, the media item requests are distributed among the server nodes in a skewed, yet directed manner that favors certain servers above others even when using a random distribution algorithm.

Figure 12:
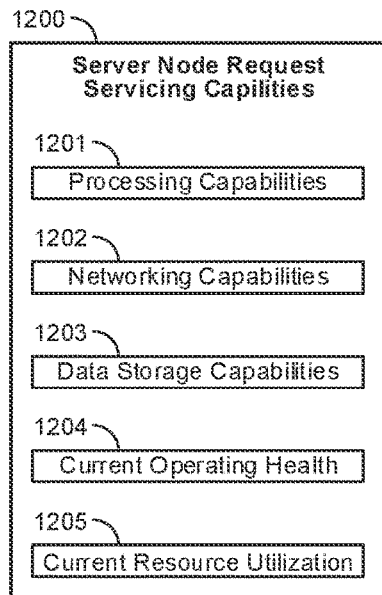
FIG. 12 illustrates an embodiment showing example capabilities of a server node.

In some cases, this process further includes determining the request servicing capabilities of the server nodes. For example, as shown in FIG. 12, the loading module 117 of computer system 101 of FIG. 1 uses server node request servicing capabilities 1200 to determine how the server nodes are to be preloaded in the loading assignment 118. The request servicing capabilities 1200 of the server nodes generally indicate each server node's (or each server cluster's) ability to service incoming client requests. The request servicing capabilities 1200 of the server nodes include processing capabilities 1201, networking capabilities 1202, data storage capabilities 1203, current operating health 1204, current resource utilization 1205, as well as other capabilities. The server node's processing capabilities 1201 refer to the server node's central processing unit (CPU), number and/or speed of CPU cores, memory (e.g., RAM) available, number of CPU cores that can be dynamically added (e.g., via networked computer systems), or other data processing components. Some server nodes may have relatively large amounts of processing resources, most of which is high-speed, up-to-date technology, while other server nodes have relatively small amounts of processing resources, some of which may be lower-speed, older (and cheaper) technology. Thus, some server nodes are capable of providing very large amounts of processing resources, while other server nodes are only capable of providing smaller amounts of processing resources to service data requests.

Similarly, networking capabilities 1202 refers to the server node's ability to send and receive data. Some server nodes may include multiple high-speed (e.g., Gbit) network adapters, while other server nodes have fewer and lower-speed network adapters. Some server nodes may have wired network adapters, while other server nodes have wireless adapters or a combination of the two. Some server nodes may be configured to dynamically add networking resources when needed (e.g., tap into other server nodes' networking hardware). Thus, the networking capabilities 1202 indicates each server node's ability to transfer data over a network.

Data storage capabilities 1203 refers to the server node's ability to store digital data. Each server node may store the digital data (e.g., media items or other data) in a local data store and/or in a distributed data store. The data storage capabilities 1203 indicate, at least in some cases, which type(s) of data storage are used including, without limitation, solid-state drives, hard disk drives, optical storage media, tape drives, holographic storage, or other types of data stores. Some of these data storage types are faster than others (e.g., solid-state drives store and serve data much faster than hard drives), while some data storage types store more data than others (hard disk drives and tape drives store much more data than solid-state drives or optical devices). Thus, due to the storage type(s) used, each server node will be better or worse at providing large amounts of data to a large number of users (e.g., for popular media items), or storing large quantities of less popular media items.

The current operating health 1204 indicates how each server node is currently operating. If the server node's CPU is overheating, or if the server node has had one or more of its network adapters go down, or if the node's data store has lost one or more storage devices, that server node's health will be considered poor. And, on the other hand, if the CPU is operating in a normal temperature range, if the network adapter has fully functioning network adapters, and/or if the data store has a sufficient number of working storage devices, the server node will be considered in good health. Thus, using any of these (or other health) factors, the ability of the server node to service client requests (i.e., the server node's health) may be determined and used as a factor when determining how to preload media items for a directed distribution. Still further, the current resource utilization 1205 indicates how much processing capacity, how much networking capacity, how much data storage capacity, etc. is currently available. Server nodes that have a high amount of available processing resources, have a high amount of available networking capacity, and/or have a large amount of data storage capacity will rank higher as having relatively low resource utilization. Server nodes with a lower amount of available processing resources, a lower amount of available networking capacity, and/or a small amount of data storage capacity will rank lower as having relatively high resource utilization. In this manner, these and other request servicing capabilities may be considered when determining how to preload server nodes with media items.

Figure 13:
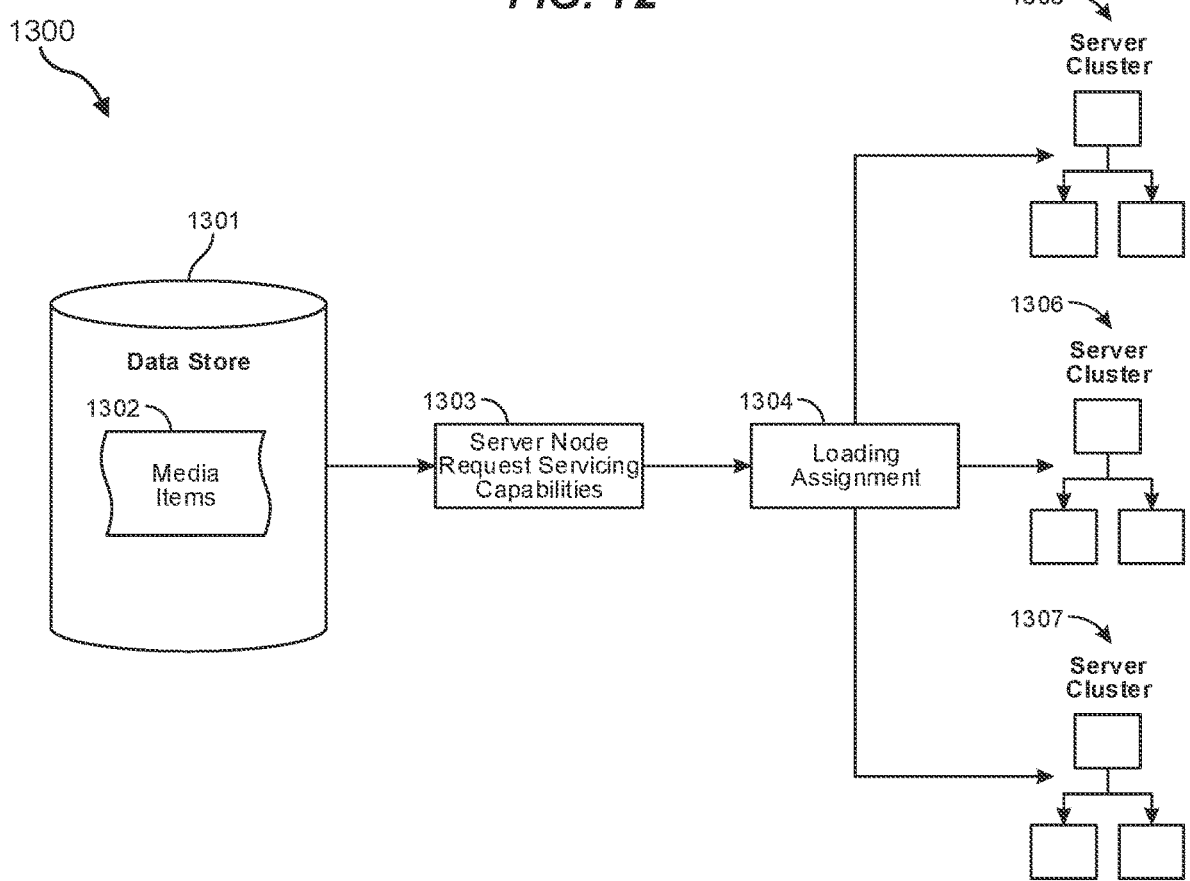
FIG. 13 illustrates an embodiment in which server node request servicing capabilities are implemented when determining a media item loading assignment.

FIG. 13 illustrates an embodiment in which server node request servicing capabilities 1303 (which may be the same as or different than the capabilities 1200 of FIG. 12) are used to distribute media items 1302 from a data store 1301 to various server clusters (e.g., 1305, 1306, and/or 1307) or server nodes within those clusters according to a loading assignment 1304. In some embodiments, the data storage capabilities 1203 used when identifying the loading assignment 1304 include an indication of each server cluster's or each server node's data storage hardware. As noted above, this data storage hardware includes solid-state drives (SSDs), hard disk drives (HDDs), or other types of storage devices. In some cases, server nodes that have more solid-state storage (e.g., on SSDs or Flash drives) are assigned a loading assignment 1304 that receives an increased number of media item requests. Indeed, at least in some examples, some server nodes are designed to have relatively large amounts of SSD storage space. SSDs are capable of accessing and serving data to very high numbers of users simultaneously. As such, these types of server nodes may be more suited to storing popular material (e.g., as shown in FIGS. 3 & 4 above) that receives (or is projected to receive) a high number of incoming requests.

Figure 14A:
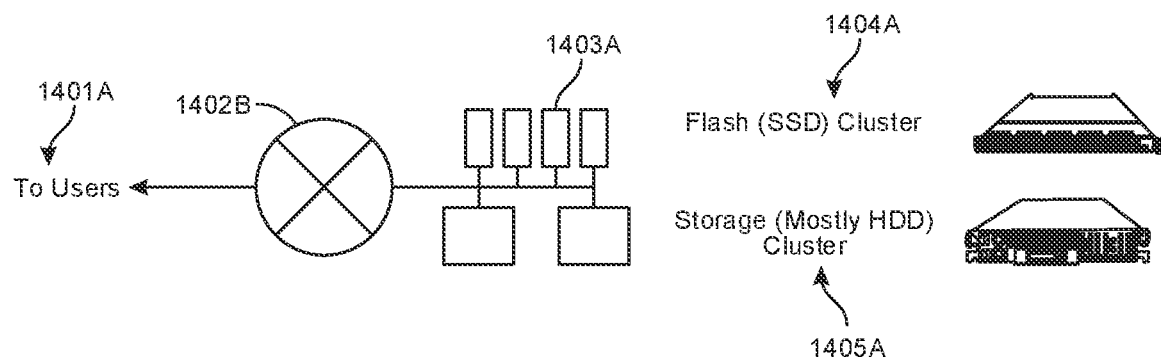
FIGS. 14A and 14B illustrate embodiments in which different server clusters have different types of data storage media.
Figure 14B:
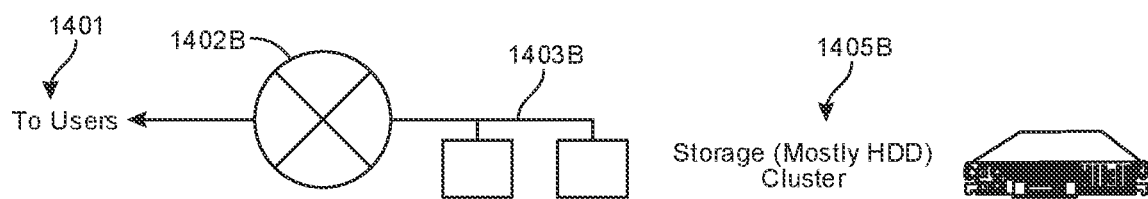

As shown in FIGS. 14A and 14B, for example, some server clusters include primarily SSD (Flash) storage (e.g., 1404A), while other server clusters include solely or primarily HDD storage (e.g., 1405A and 1405B). In FIG. 14A, the server cluster 1403A includes four SSD clusters 1404A and two HDD clusters 1405A. The SSD clusters store less data, but serve that data much faster to users 1401A via router (or other networking hardware) 1402B, whereas server cluster 1403B includes two HDD devices and no SSD devices. In such cases, the server cluster 1403B may be best suited to store large numbers of less popular media items. At least in some embodiments, the underlying system uses knowledge of each cluster's data storage hardware to determine the optimal manner in which to preload media items to provide the directed distribution. Once this determination is made, the preloading instructions 127 is sent to the server nodes 130 of FIG. 1 (or to the storage clusters 1404A-1405B of FIG. 14) to preload media items onto those server nodes in the prescribed manner. Moreover, it will be understood that the term "preloading instructions" 127 refers to an initial loading of a media item onto a data store, or to any future movements of the data item to other storage devices. Thus, the "loading assignment" 118 refers to preloading activities (where loading is based on how well a media item is anticipated to be received) and general loading or reloading activities where media items are moved from SSD to HDD, or from HDD to SSD, or between other storage devices at a later time after the initial preloading.

In some embodiments, the networking capabilities 1202 used when identifying the loading assignment 118 include an indication of each server node's (or each server cluster's) networking hardware. In some cases, server nodes that have an increased amount of networking bandwidth are given a loading assignment 118 that receives an increased number of media item requests. For instance, as shown in FIG. 3, the amount of data bytes streamed is much higher for popular titles than it is for less popular titles. As such, the loading assignment 118 assigns more popular media items (whether those items are currently popular based on a tracked number of media item requests, or whether those items are projected to be popular based on viewership for similar items, or based on the persons involved in creating the media item) to server nodes or clusters that have an increased amount of networking bandwidth. This may be due to the node or cluster having an increased amount of network adapters, or access to higher-bandwidth data links, or due to a shorter network path between a majority of users and the stored content, etc. Regardless of how the increased amount of networking bandwidth is achieved, the loading module 117 takes the networking capabilities of the server node or cluster into account when determining where to initially load media items, or where to move media items after they become less popular over time.

Similarly, at least in some embodiments, the loading module 117 takes into account processing capabilities 1201 when identifying the loading assignment 118, including accessing an indication of each server node's processing hardware. The hardware indication may identify the type of processor(s) used, the number of CPU cores, the type of memory used (e.g., RAM or DRAM), the overall amount of memory available, the amount of memory that is currently available, the number and/or type of machine learning processors available, the number and/or type of graphics processing units (GPUs) available, the number and/or type of special-purpose processors available, or any other processing hardware that is provided by the server node or cluster. In such cases, server nodes or clusters that have an increased amount of processing power or processing bandwidth are given a loading assignment 118 that is designed to receive an increased number of media item requests.

Still further, at least in some embodiments, server nodes that have an increased amount of current operating health 1204 are given a loading assignment 118 that is designed to receive an increased number of media item requests. As such, nodes that are operating within normal temperature ranges, nodes that are not experiencing faults, nodes that are not experiencing storage device failures, or network adapter failures, or are not experiencing software crashes or other types of failures are given loading assignments that will send an increased number of media item requests to those nodes. Similarly, server nodes or clusters that have a decreased amount of current resource utilization and thus have available processing, networking, or storage resources, are given a loading assignment 118 that is designed to receive an increased number of media item requests.

Any or all of the server node request servicing capabilities 1200 may be used by the loading module 117 to rank the available server nodes or clusters and determine how each cluster or node is best used. Some nodes or clusters are more suited to storing large amounts of data provided to fewer users at lower speed, while other nodes or clusters are more suited to storing smaller amounts of data provided to larger numbers of users at higher speeds. The loading module 117 takes this into account when determining the loading assignments 118 that will ultimately load the media items in a way that skews distribution to specific servers, even while distributing the media item requests 126 using a random distribution algorithm 121.

Figure 15:
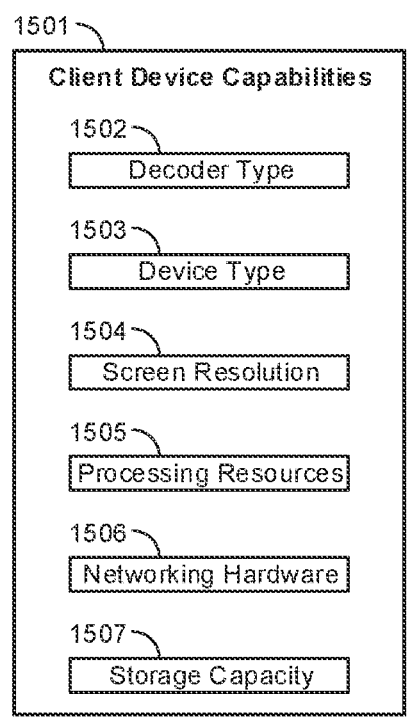
FIG. 15 illustrates an embodiment showing example capabilities of a client device.
Figure 16:
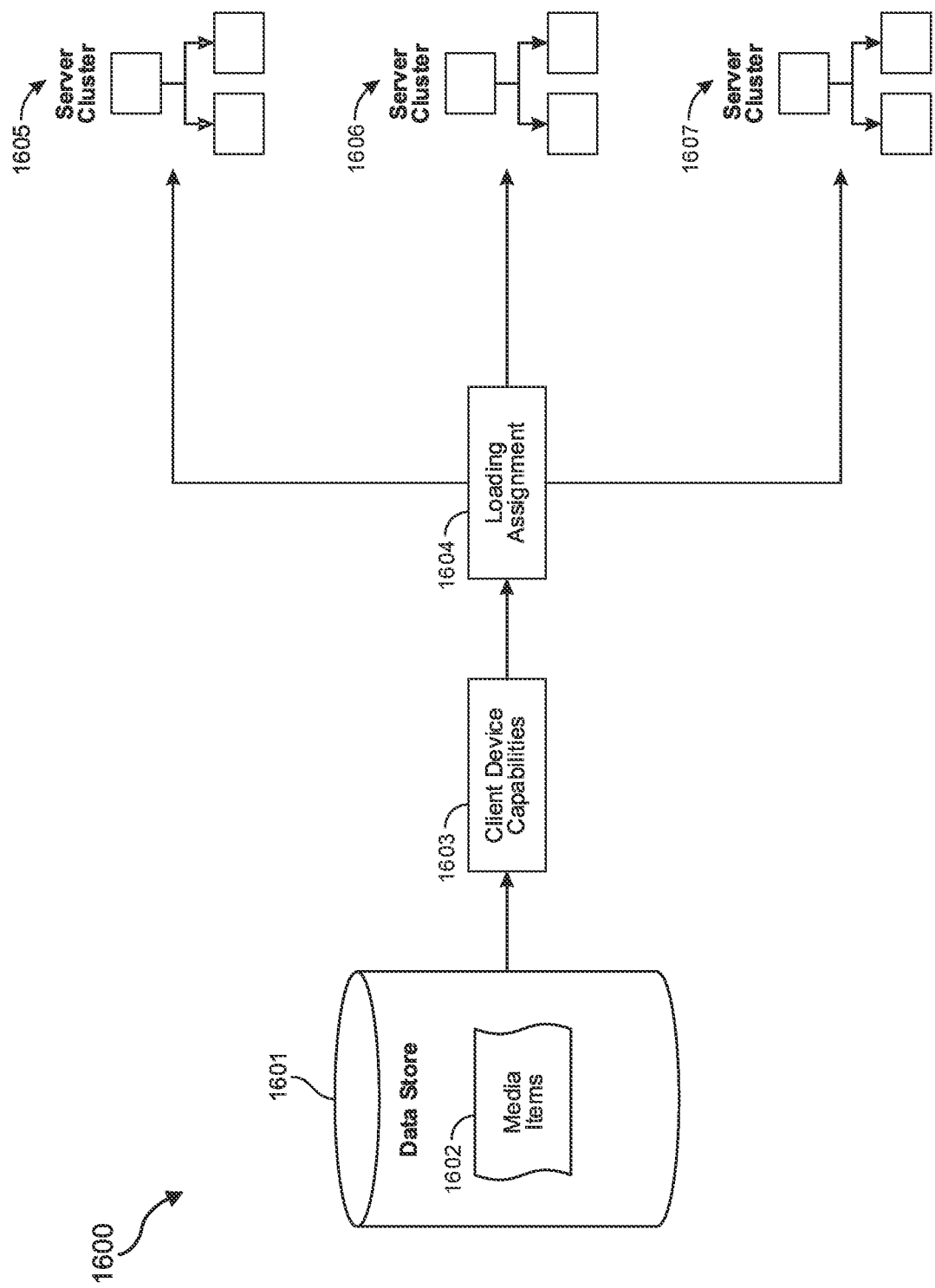
FIG. 16 illustrates an embodiment in which client device capabilities are implemented when determining a media item loading assignment.

In some embodiments, identifying the loading assignment 118 includes, as a at least one factor, different capabilities of a client device from which the media item requests were received (e.g., client device 125A, 125B, or 125C). In some cases, as shown in FIG. 15, the capabilities of the client device 1501 include, without limitation, a decoder type 1502, a device type 1503, a screen resolution 1504, an indication of processing resources 1505, an indication of networking hardware 1506, an indication of data storage capacity 1507, or other characteristics of the client device. As shown in environment 1600 of FIG. 16, for example, the media items 1602 in data store 1601 may be loaded according to a loading assignment 1604 onto one or more server clusters 1605, 1606, and/or 1607. The loading assignment 1604 may take into account the capabilities of the client devices 1603 that are sending the requests for the media items 1602.

The decoder type 1502, for instance, indicates the type of decoder that the client device uses to decode audiovisual data. Some client devices have highly efficient, powerful video decoders that are capable of decoding large amounts of data on a high-resolution screen. Other client devices have less efficient, less powerful video decoders that are only capable of handling smaller amounts of data. Accordingly, this disparity may be taken into account when generating the loading assignment. If a given cluster receives an overwhelming number of media item requests from client devices that have less powerful video decoders (e.g., feature phones), versions of media items that are encoded at lower resolution may be optimally stored on that cluster.

Device type 1503 may also be considered by the loading module 117. If a specific server node or server cluster receives a large number of media item requests from televisions or personal computers that have large display screens, higher-resolution versions of media items are optimally loaded onto those nodes or clusters. If certain clusters receive the majority of their requests from smartphones that generally have high-resolution screens (e.g., 1504), the loading module 117 will load specific, high-quality encodings of the media items onto those nodes or clusters.

Moreover, in some embodiments, server nodes that provide specific media items encoded for client devices that have less than a threshold level of processing resources 1505 (e.g., CPU cores, RAM, etc.) are assigned a loading assignment 118 that receives media item requests for those client devices that have less than the threshold level of processing resources. In such cases, client devices whose processing resources are below the threshold will ultimately be sent to one cluster according to the directed distribution, while client devices whose processing resources are above the threshold will be sent to another cluster, again, according to the directed distribution. In a similar manner, media item preloading may result in requests from client devices whose networking hardware 1506 or storage capacity 1507 are above specified thresholds will be sent to certain server nodes or clusters, while requests from client devices whose networking hardware or storage capacity are below specified thresholds will be sent to different server nodes or clusters. It should be noted that either or both of the server node request servicing capabilities 1200 and the client device capabilities 1501 may be used as factors when determining an optimal loading assignment 118 for the directed distribution 122.

In some embodiments, server nodes that have provided specific media items in the past are given a loading assignment 118 that receives an increased number of media item requests for contextually similar media items. In such cases, media items that share a similar genre, similar titles, similar actors, or other contextual similarities are preloaded onto the same server node or cluster. Then, when the request routing module 120 routes the media item requests 126 according to the random distribution algorithm 121, the media item requests for the contextually similar media items will be skewed to those server nodes or clusters.

Still further, in some examples, server nodes that are predicted to receive an increased number of media item requests for specific media items are given a loading assignment 118 to provide those specific media items. Thus, in such cases, the computer system 101 identifies past request distribution information to determine how many media item requests were received for each given media item and then predict, from that information, which media items will be more heavily requested. The loading module 117 then implements this prediction information when generating the loading assignment 118. In this manner, media items may be preloaded in a manner that skews distribution of media item requests according to a controlled, directed distribution, even when assigning media item requests to server nodes or clusters using a random distribution algorithm.

In addition, a corresponding system includes at least one physical processor and physical memory comprising computer-executable instructions that, when executed by the physical processor, cause the physical processor to: determine that incoming media item requests are to be skewed from a random distribution among server nodes, that uses a random distribution algorithm, to a directed distribution among the server nodes, identify, in a loading assignment, which of a plurality of media items are to be loaded onto specific server nodes to produce the directed distribution of media item requests, preload the identified media items onto the server nodes according to the loading assignment, receive media item requests for the preloaded media items, and route the received media item requests to the server nodes using the random distribution algorithm, where the random distribution algorithm is skewed to the directed distribution based on the preloading of the media items according to the identified loading assignment.

In some examples, the above-described method is encoded as computer-readable instructions on a computer-readable medium. For example, a computer-readable medium may include one or more computer-executable instructions that, when executed by at least one processor of a computing device, cause the computing device to: determine that incoming media item requests are to be skewed from a random distribution among server nodes, that uses a random distribution algorithm, to a directed distribution among the server nodes, identify, in a loading assignment, which of a plurality of media items are to be loaded onto specific server nodes to produce the directed distribution of media item requests, preload the identified media items onto the server nodes according to the loading assignment, receive media item requests for the preloaded media items, and route the received media item requests to the server nodes using the random distribution algorithm, where the random distribution algorithm is skewed to the directed distribution based on the preloading of the media items according to the identified loading assignment.

Still further, an alternative system includes at least one physical processor and physical memory comprising computer-executable instructions that, when executed by the physical processor, cause the physical processor to: determine, for a set of electronic devices, which server nodes are capable of providing media items to the set of electronic devices, pre-calculate, from the determined server nodes, a server node ranking that ranks the server nodes' ability to provide the media items to the set of electronic devices according to one or more media item provisioning factors, receive a request indicating that a media item is to be provided to a specific electronic device among the set of electronic devices, access the precalculated server node ranking for the set of electronic devices, and instruct a specified optimal server node, according to the precalculated server node ranking, to provide the media item to the specified electronic device.

Additionally or alternatively, in some examples, the above-described methods are encoded as computer-readable instructions on a computer-readable medium. For example, a computer-readable medium may include one or more computer-executable instructions that, when executed by at least one processor of a computing device, cause the computing device to: determine, for a set of electronic devices, which server nodes are capable of providing media items to the set of electronic devices, pre-calculate, from the determined server nodes, a server node ranking that ranks the server nodes' ability to provide the media items to the set of electronic devices according to one or more media item provisioning factors, receive a request indicating that a media item is to be provided to a specific electronic device among the set of electronic devices, access the precalculated server node ranking for the set of electronic devices, and instruct a specified optimal server node, according to the precalculated server node ranking, to provide the media item to the specified electronic device.

Figure 17:
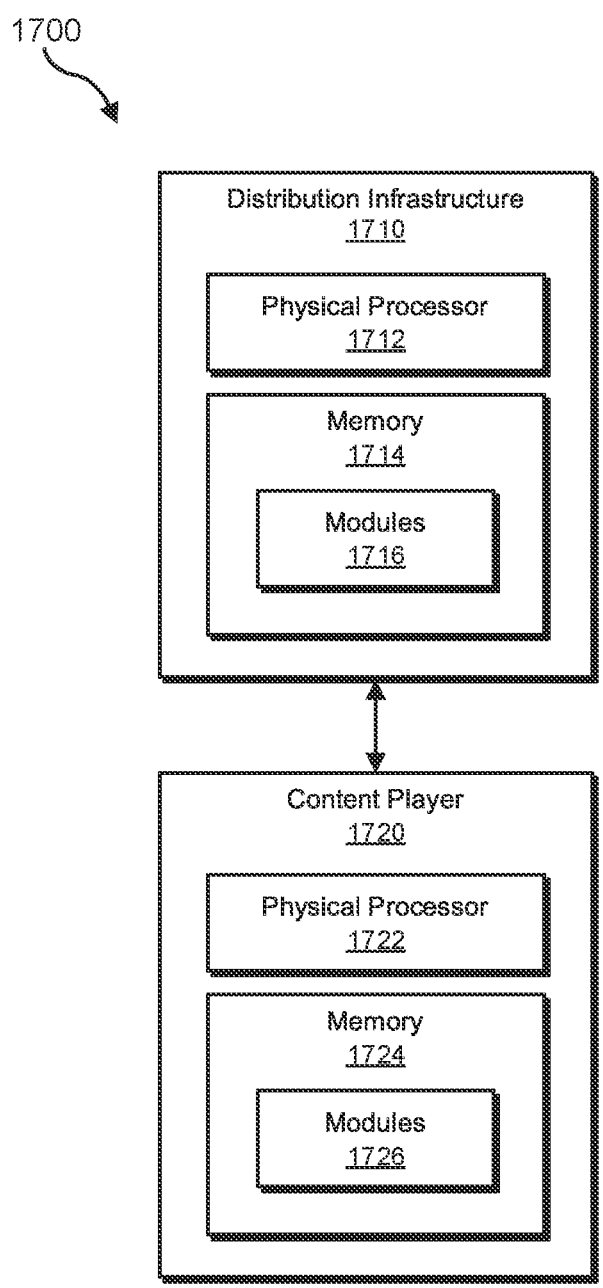
FIG. 17 is a block diagram of an exemplary content distribution ecosystem.
Figure 18:
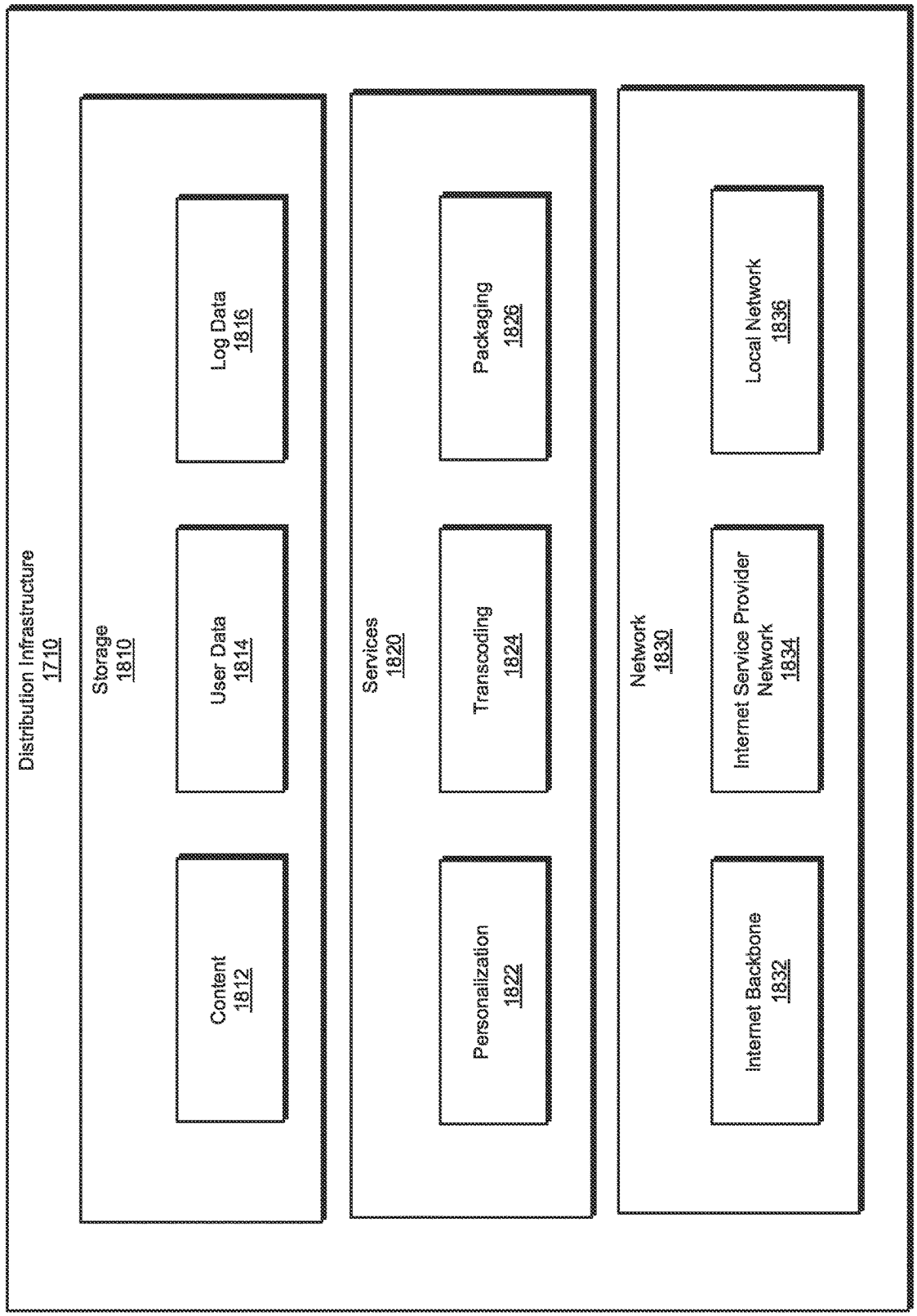
FIG. 18 is a block diagram of an exemplary distribution infrastructure within the content distribution ecosystem shown in FIG. 17.
Figure 19:
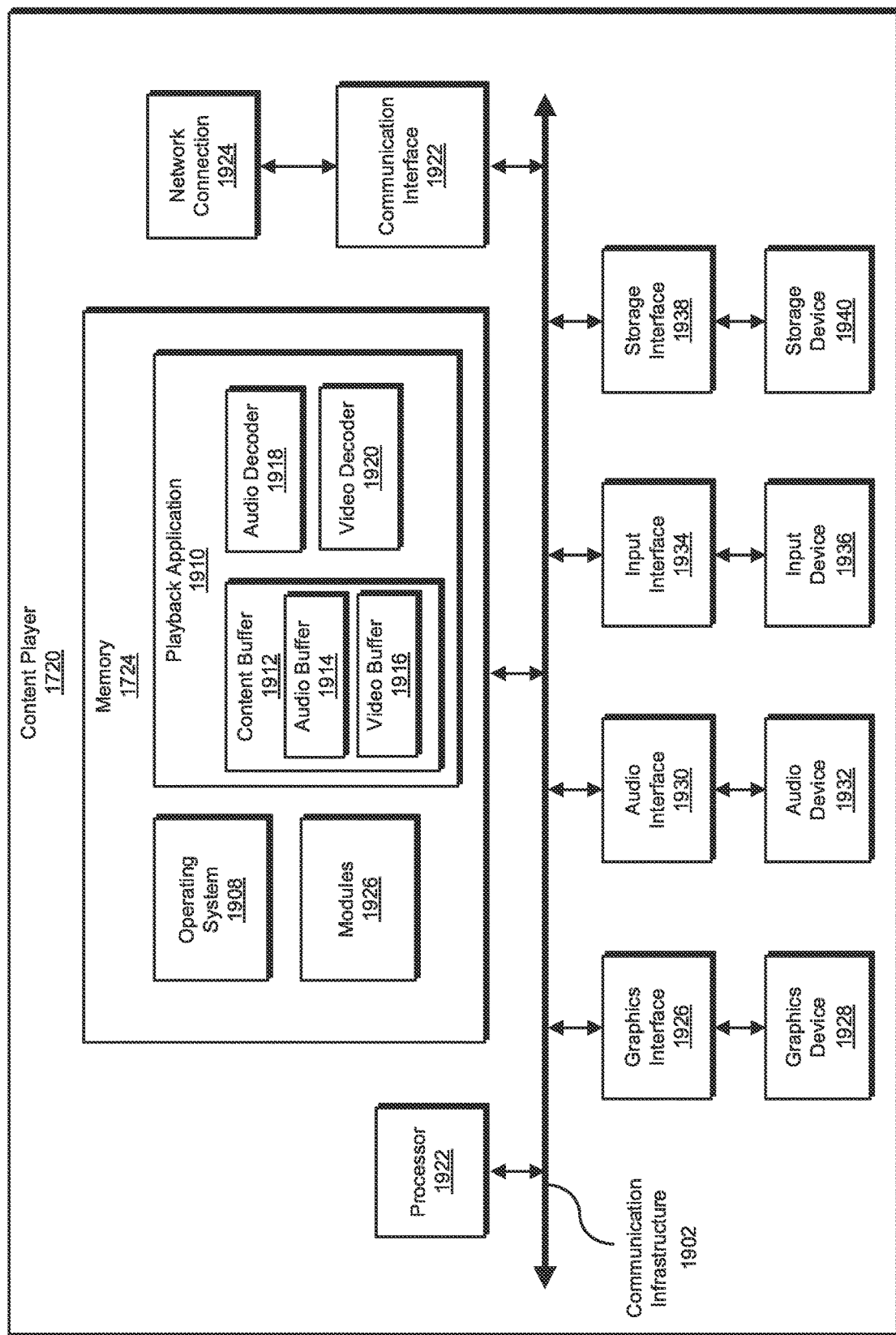
FIG. 19 is a block diagram of an exemplary content player within the content distribution ecosystem shown in FIG. 18.

The following will provide, with reference to FIG. 17, detailed descriptions of exemplary ecosystems in which content is provisioned to end nodes and in which requests for content are steered to specific end nodes. The discussion corresponding to FIGS. 18 and 19 presents an overview of an exemplary distribution infrastructure and an exemplary content player used during playback sessions, respectively. These exemplary ecosystems and distribution infrastructures are implemented in any of the embodiments described above with reference to FIGS. 1-16.

FIG. 17 is a block diagram of a content distribution ecosystem 1700 that includes a distribution infrastructure 1710 in communication with a content player 1720. In some embodiments, distribution infrastructure 1710 is configured to encode data at a specific data rate and to transfer the encoded data to content player 1720. Content player 1720 is configured to receive the encoded data via distribution infrastructure 1710 and to decode the data for playback to a user. The data provided by distribution infrastructure 1710 includes, for example, audio, video, text, images, animations, interactive content, haptic data, virtual or augmented reality data, location data, gaming data, or any other type of data that is provided via streaming.

Distribution infrastructure 1710 generally represents any services, hardware, software, or other infrastructure components configured to deliver content to end users. For example, distribution infrastructure 1710 includes content aggregation systems, media transcoding and packaging services, network components, and/or a variety of other types of hardware and software. In some cases, distribution infrastructure 1710 is implemented as a highly complex distribution system, a single media server or device, or anything in between. In some examples, regardless of size or complexity, distribution infrastructure 1710 includes at least one physical processor 1712 and at least one memory device 1714. One or more modules 1716 are stored or loaded into memory 1714 to enable adaptive streaming, as discussed herein.

Content player 1720 generally represents any type or form of device or system capable of playing audio and/or video content that has been provided over distribution infrastructure 1710. Examples of content player 1720 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1710, content player 1720 includes a physical processor 1722, memory 1724, and one or more modules 1726. Some or all of the adaptive streaming processes described herein is performed or enabled by modules 1726, and in some examples, modules 1716 of distribution infrastructure 1710 coordinate with modules 1726 of content player 1720 to provide adaptive streaming of digital content.

In certain embodiments, one or more of modules 1716 and/or 1726 in FIG. 17 represent one or more software applications or programs that, when executed by a computing device, cause the computing device to perform one or more tasks. For example, and as will be described in greater detail below, one or more of modules 1716 and 1726 represent modules stored and configured to run on one or more general-purpose computing devices. One or more of modules 1716 and 1726 in FIG. 17 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1712 and 1722 generally represent any type or form of hardware-implemented processing unit capable of interpreting and/or executing computer-readable instructions. In one example, physical processors 1712 and 1722 access and/or modify one or more of modules 1716 and 1726, respectively. Additionally or alternatively, physical processors 1712 and 1722 execute one or more of modules 1716 and 1726 to facilitate adaptive streaming of digital content. Examples of physical processors 1712 and 1722 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1714 and 1724 generally represent any type or form of volatile or non-volatile storage device or medium capable of storing data and/or computer-readable instructions. In one example, memory 1714 and/or 1724 stores, loads, and/or maintains one or more of modules 1716 and 1726. Examples of memory 1714 and/or 1724 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 18 is a block diagram of exemplary components of content distribution infrastructure 1710 according to certain embodiments. Distribution infrastructure 1710 includes storage 1810, services 1820, and a network 1830. Storage 1810 generally represents any device, set of devices, and/or systems capable of storing content for delivery to end users. Storage 1810 includes a central repository with devices capable of storing terabytes or petabytes of data and/or includes distributed storage systems (e.g., appliances that mirror or cache content at Internet interconnect locations to provide faster access to the mirrored content within certain regions). Storage 1810 is also configured in any other suitable manner.

As shown, storage 1810 may store a variety of different items including content 1812, user data 1814, and/or log data 1816. Content 1812 includes television shows, movies, video games, user-generated content, and/or any other suitable type or form of content. User data 1814 includes personally identifiable information (PII), payment information, preference settings, language and accessibility settings, and/or any other information associated with a particular user or content player. Log data 1816 includes viewing history information, network throughput information, and/or any other metrics associated with a user's connection to or interactions with distribution infrastructure 1710.

Services 1820 includes personalization services 1822, transcoding services 1824, and/or packaging services 1826. Personalization services 1822 personalize recommendations, content streams, and/or other aspects of a user's experience with distribution infrastructure 1710. Encoding services 1824 compress media at different bitrates which, as described in greater detail below, enable real-time switching between different encodings. Packaging services 1826 package encoded video before deploying it to a delivery network, such as network 1830, for streaming.

Network 1830 generally represents any medium or architecture capable of facilitating communication or data transfer. Network 1830 facilitates communication or data transfer using wireless and/or wired connections. Examples of network 1830 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 18, network 1830 includes an Internet backbone 1832, an internet service provider 1834, and/or a local network 1836. As discussed in greater detail below, bandwidth limitations and bottlenecks within one or more of these network segments triggers video and/or audio bit rate adjustments.

FIG. 19 is a block diagram of an exemplary implementation of content player 1720 of FIG. 17. Content player 1720 generally represents any type or form of computing device capable of reading computer-executable instructions. Content player 1720 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 19, in addition to processor 1722 and memory 1724, content player 1720 includes a communication infrastructure 1902 and a communication interface 1922 coupled to a network connection 1924. Content player 1720 also includes a graphics interface 1926 coupled to a graphics device 1928, an input interface 1934 coupled to an input device 1936, and a storage interface 1938 coupled to a storage device 1940.

Communication infrastructure 1902 generally represents any type or form of infrastructure capable of facilitating communication between one or more components of a computing device. Examples of communication infrastructure 1902 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1724 generally represents any type or form of volatile or non-volatile storage device or medium capable of storing data and/or other computer-readable instructions. In some examples, memory 1724 stores and/or loads an operating system 1908 for execution by processor 1722. In one example, operating system 1908 includes and/or represents software that manages computer hardware and software resources and/or provides common services to computer programs and/or applications on content player 1720.

Operating system 1908 performs various system management functions, such as managing hardware components (e.g., graphics interface 1926, audio interface 1930, input interface 1934, and/or storage interface 1938). Operating system 1908 also provides process and memory management models for playback application 1910. The modules of playback application 1910 includes, for example, a content buffer 1912, an audio decoder 1918, and a video decoder 1920.

Playback application 1910 is configured to retrieve digital content via communication interface 1922 and play the digital content through graphics interface 1926. Graphics interface 1926 is configured to transmit a rendered video signal to graphics device 1928. In normal operation, playback application 1910 receives a request from a user to play a specific title or specific content. Playback application 1910 then identifies one or more encoded video and audio streams associated with the requested title. After playback application 1910 has located the encoded streams associated with the requested title, playback application 1910 downloads sequence header indices associated with each encoded stream associated with the requested title from distribution infrastructure 1710. A sequence header index associated with encoded content includes information related to the encoded sequence of data included in the encoded content.

In one embodiment, playback application 1910 begins downloading the content associated with the requested title by downloading sequence data encoded to the lowest audio and/or video playback bitrates to minimize startup time for playback. The requested digital content file is then downloaded into content buffer 1912, which is configured to serve as a first-in, first-out queue. In one embodiment, each unit of downloaded data includes a unit of video data or a unit of audio data. As units of video data associated with the requested digital content file are downloaded to the content player 1720, the units of video data are pushed into the content buffer 1912. Similarly, as units of audio data associated with the requested digital content file are downloaded to the content player 1720, the units of audio data are pushed into the content buffer 1912. In one embodiment, the units of video data are stored in video buffer 1916 within content buffer 1912 and the units of audio data are stored in audio buffer 1914 of content buffer 1912.

A video decoder 1920 reads units of video data from video buffer 1916 and outputs the units of video data in a sequence of video frames corresponding in duration to the fixed span of playback time. Reading a unit of video data from video buffer 1916 effectively de-queues the unit of video data from video buffer 1916. The sequence of video frames is then rendered by graphics interface 1926 and transmitted to graphics device 1928 to be displayed to a user.

An audio decoder 1918 reads units of audio data from audio buffer 1914 and outputs the units of audio data as a sequence of audio samples, generally synchronized in time with a sequence of decoded video frames. In one embodiment, the sequence of audio samples is transmitted to audio interface 1930, which converts the sequence of audio samples into an electrical audio signal. The electrical audio signal is then transmitted to a speaker of audio device 1932, which, in response, generates an acoustic output.

In situations where the bandwidth of distribution infrastructure 1710 is limited and/or variable, playback application 1910 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1926 is configured to generate frames of video data and transmit the frames of video data to graphics device 1928. In one embodiment, graphics interface 1926 is included as part of an integrated circuit, along with processor 1722. Alternatively, graphics interface 1926 is configured as a hardware accelerator that is distinct from (i.e., is not integrated within) a chipset that includes processor 1722.

Graphics interface 1926 generally represents any type or form of device configured to forward images for display on graphics device 1928. For example, graphics device 1928 is fabricated using liquid crystal display (LCD) technology, cathode-ray technology, and light-emitting diode (LED) display technology (either organic or inorganic). In some embodiments, graphics device 1928 also includes a virtual reality display and/or an augmented reality display. Graphics device 1928 includes any technically feasible means for generating an image for display. In other words, graphics device 1928 generally represents any type or form of device capable of visually displaying information forwarded by graphics interface 1926.

As illustrated in FIG. 19, content player 1720 also includes at least one input device 1936 coupled to communication infrastructure 1902 via input interface 1934. Input device 1936 generally represents any type or form of computing device capable of providing input, either computer or human generated, to content player 1720. Examples of input device 1936 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 1720 also includes a storage device 1940 coupled to communication infrastructure 1902 via a storage interface 1938. Storage device 1940 generally represents any type or form of storage device or medium capable of storing data and/or other computer-readable instructions. For example, storage device 1940 is a magnetic disk drive, a solid-state drive, an optical disk drive, a flash drive, or the like. Storage interface 1938 generally represents any type or form of interface or device for transferring data between storage device 1940 and other components of content player 1720.

EXAMPLE EMBODIMENTS

1. A computer-implemented method comprising: determining that incoming media item requests are to be skewed from a random distribution among server nodes, that uses a random distribution algorithm, to a directed distribution among the server nodes, identifying, in a loading assignment, which of a plurality of media items are to be loaded onto specific server nodes to produce the directed distribution of media item requests, preloading the identified media items onto the server nodes according to the loading assignment, receiving one or more media item requests for the preloaded media items, and routing the received media item requests to the server nodes using the random distribution algorithm, the random distribution algorithm being skewed to the directed distribution based on the preloading of the media items according to the identified loading assignment.

2. The computer-implemented method of claim 1, further comprising determining one or more request servicing capabilities of the server nodes.

3. The computer-implemented method of claim 2, wherein identifying the loading assignment includes, as a factor, the request servicing capabilities of the server nodes.

4. The computer-implemented method of claim 3, wherein the request servicing capabilities of the server nodes comprise at least one of processing capabilities, networking capabilities, data storage capabilities, current operating health, or current resource utilization.

5. The computer-implemented method of claim 4, wherein the data storage capabilities used when identifying the loading assignment comprise an indication of each server node's data storage hardware.

6. The computer-implemented method of claim 5, wherein server nodes that have an increased amount of solid-state storage are assigned a loading assignment that receives an increased number of media item requests.

7. The computer-implemented method of claim 4, wherein the networking capabilities used when identifying the loading assignment comprise an indication of each server node's networking hardware.

8. The computer-implemented method of claim 7, wherein server nodes that have an increased amount of networking bandwidth are assigned a loading assignment that receives an increased number of media item requests.

9. The computer-implemented method of claim 4, wherein the processing capabilities used when identifying the loading assignment comprise an indication of each server node's processing hardware.

10. The computer-implemented method of claim 9, wherein server nodes that have an increased amount of processing bandwidth are assigned a loading assignment that receives an increased number of media item requests.

11. The computer-implemented method of claim 4, wherein server nodes that have an increased amount of current operating health are assigned a loading assignment that receives an increased number of media item requests.

12. The computer-implemented method of claim 4, wherein server nodes that have a decreased amount of current resource utilization are assigned a loading assignment that receives an increased number of media item requests.

13. A system comprising: at least one physical processor; and physical memory comprising computer-executable instructions that, when executed by the physical processor, cause the physical processor to: determine that incoming media item requests are to be skewed from a random distribution among server nodes, that uses a random distribution algorithm, to a directed distribution among the server nodes, identify, in a loading assignment, which of a plurality of media items are to be loaded onto specific server nodes to produce the directed distribution of media item requests, preload the identified media items onto the server nodes according to the loading assignment, receive one or more media item requests for the preloaded media items, and route the received media item requests to the server nodes using the random distribution algorithm, the random distribution algorithm being skewed to the directed distribution based on the preloading of the media items according to the identified loading assignment.

14. The system of claim 13, wherein identifying the loading assignment includes, as a factor, one or more capabilities of a client device from which the one or more media item requests were received.

15. The system of claim 14, wherein the capabilities of the client device comprise at least one of a decoder type, a device type, a screen resolution, an indication of processing resources, an indication of networking hardware, or an indication of data storage capacity of the client device.

16. The system of claim 15, wherein server nodes that provide media items encoded for a specific device type are assigned a loading assignment that receives an increased number of media item requests.

17. The system of claim 15, wherein server nodes that provide specific media items encoded for client devices having less than a threshold level of processing resources are assigned a loading assignment that receives media item requests for those client devices that have less than the threshold level of processing resources.

18. The system of claim 13, wherein server nodes that have provided specific media items in the past are assigned a loading assignment that receives an increased number of media item requests for contextually similar media items.

19. The system of claim 13, wherein server nodes that are predicted to receive an increased number of media item requests for specific media items are assigned a loading assignment to provide those specific media items.

20. A non-transitory computer-readable medium comprising one or more computer-executable instructions that, when executed by at least one processor of a computing device, cause the computing device to: determine that incoming media item requests are to be skewed from a random distribution among server nodes, that uses a random distribution algorithm, to a directed distribution among the server nodes, identify, in a loading assignment, which of a plurality of media items are to be loaded onto specific server nodes to produce the directed distribution of media item requests, preload the identified media items onto the server nodes according to the loading assignment, receive one or more media item requests for the preloaded media items, and route the received media item requests to the server nodes using the random distribution algorithm, the random distribution algorithm being skewed to the directed distribution based on the preloading of the media items according to the identified loading assignment.

1. A computer-implemented method comprising: determining, for a set of electronic devices, which server nodes are capable of providing media items to the set of electronic devices, from the determined server nodes, pre-calculating a server node ranking that ranks the server nodes' ability to provide the media items to the set of electronic devices according to one or more media item provisioning factors, receiving a request indicating that a media item is to be provided to a specific electronic device among the set of electronic devices, accessing the precalculated server node ranking for the set of electronic devices, and instructing a specified optimal server node, according to the precalculated server node ranking, to provide the media item to the specified electronic device.

2. The computer-implemented method of claim 1, wherein the server nodes are part of one or more specified server clusters.

3. The computer-implemented method of claim 2, wherein the server node ranking is extended to include rankings for one or more server clusters based on at least one of the one or more media item provisioning factors.

4. The computer-implemented method of claim 1, wherein the media item provisioning factors include at least one of proximity, cost, geography, server node health, popularity, server node processing hardware, or server node networking hardware.

5. The computer-implemented method of claim 1, wherein the specified electronic device is identified as being part of the set of electronic devices based on an associated identifier.

6. The computer-implemented method of claim 5, wherein the associated identifier of the specified electronic device comprises an internet protocol (IP) address.

7. The computer-implemented method of claim 6, wherein the IP address of the specified electronic device is part of a classless inter-domain routing (CIDR) block of IP addresses.

8. The computer-implemented method of claim 7, wherein the set of electronic devices for which server nodes are capable of providing media items is represented by the CIDR block.

9. The computer-implemented method of claim 7, wherein the precalculated server node ranking ranks each of the server nodes who service IP addresses in each CIDR block.

10. The computer-implemented method of claim 1, wherein the specified optimal server node comprises the highest ranked server node in the precalculated server node ranking.

11. A system comprising: at least one physical processor and physical memory comprising computer-executable instructions that, when executed by the physical processor, cause the physical processor to: determine, for a set of electronic devices, which server nodes are capable of providing media items to the set of electronic devices, from the determined server nodes, pre-calculate a server node ranking that ranks the server nodes' ability to provide the media items to the set of electronic devices according to one or more media item provisioning factors, receive a request indicating that a media item is to be provided to a specific electronic device among the set of electronic devices, access the precalculated server node ranking for the set of electronic devices, and instruct a specified optimal server node, according to the precalculated server node ranking, to provide the media item to the specified electronic device.

12. The system of claim 11, wherein the precalculated server node ranking is provided to at least a plurality of the server nodes.

13. The system of claim 12, wherein the precalculated server node ranking is compressed prior to transfer to the plurality of server nodes.

14. The system of claim 12, further comprising: determining that rankings have changed for one or more of the server nodes based on the one or more factors, propagating the rankings changes for those server nodes, such that the precalculated server node ranking is updated using only the rankings changes for those server nodes.

15. The system of claim 11, further comprising instructing the specified optimal server node to establish a peer-to-peer connection with the specified electronic device.

16. The system of claim 11, wherein server nodes having specified rankings in the precalculated server node ranking are selected to provide the media item to the specified electronic device according to one or more established policies.

17. The system of claim 11, further comprising validating one or more network routes between the specified electronic device and one or more of the server nodes to ensure that the network routes provide a threshold level of data transfer.

18. The system of claim 11, further comprising filtering one or more network routes between the specified electronic device and one or more of the server nodes to prevent erroneous routes or routes to malicious server nodes.

19. The system of claim 11, further comprising steering one or more subsequent media item requests to the specified optimal server node.

20. A non-transitory computer-readable medium comprising one or more computer-executable instructions that, when executed by at least one processor of a computing device, cause the computing device to: determine, for a set of electronic devices, which server nodes are capable of providing media items to the set of electronic devices, from the determined server nodes, pre-calculate a server node ranking that ranks the server nodes' ability to provide the media items to the set of electronic devices according to one or more media item provisioning factors, receive a request indicating that a media item is to be provided to a specific electronic device among the set of electronic devices, access the precalculated server node ranking for the set of electronic devices, and instruct a specified optimal server node, according to the precalculated server node ranking, to provide the media item to the specified electronic device.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising: determining, for a set of electronic devices, which server nodes are capable of providing media items to the set of electronic devices, the server nodes being part of one or more specified server clusters;
   from the determined server nodes, pre-calculating, prior to receiving media item requests, a server node ranking that ranks the determined server nodes according to their ability to provide the media items to the set of electronic devices according to one or more media item provisioning factors, resulting in a list of ranked server nodes;
   receiving a request indicating that a media item is to be provided to a specific electronic device among the set of electronic devices;
   accessing the list of ranked server nodes indicating the precalculated server node ranking for the set of electronic devices; and
   instructing a specified optimal server node, selected according to the precalculated server node ranking, to provide the media item to the specified electronic device.

2. The computer-implemented method of claim 1, wherein server nodes having specified rankings in the pre-calculated server node ranking are selected to provide the media item to the specified electronic device according to one or more established policies.

3. The computer-implemented method of claim 1, wherein the server node ranking is extended to include rankings for one or more server clusters based on at least one of the one or more media item provisioning factors.

4. The computer-implemented method of claim 1, wherein the media item provisioning factors include at least one of proximity, cost, geography, server node health, popularity, server node processing hardware, or server node networking hardware.

5. The computer-implemented method of claim 1, wherein the specified electronic device is identified as being part of the set of electronic devices based on an associated identifier.

6. The computer-implemented method of claim 5, wherein the associated identifier of the specified electronic device comprises an internet protocol (IP) address.

7. The computer-implemented method of claim 6, wherein the IP address of the specified electronic device is part of a classless inter-domain routing (CIDR) block of IP addresses.

8. The computer-implemented method of claim 7, wherein the set of electronic devices for which server nodes are capable of providing media items is represented by the CIDR block.

9. The computer-implemented method of claim 7, wherein the precalculated server node ranking ranks each of the server nodes who service IP addresses in each CIDR block.

10. The computer-implemented method of claim 1, wherein the specified optimal server node comprises the highest ranked server node in the precalculated server node ranking.

11. A system comprising: at least one physical processor; and physical memory comprising computer-executable instructions that, when executed by the physical processor, cause the physical processor to: determine, for a set of electronic devices, which server nodes are capable of providing media items to the set of electronic devices, the server nodes being part of one or more specified server clusters;
from the determined server nodes, pre-calculate, prior to receiving media item requests, a server node ranking that ranks the determined server nodes according to their ability to provide the media items to the set of electronic devices according to one or more media item provisioning factors, resulting in a list of ranked server nodes;
receive a request indicating that a media item is to be provided to a specific electronic device among the set of electronic devices;
access the list of ranked server nodes indicating the precalculated server node ranking for the set of electronic devices; and
instruct a specified optimal server node, selected according to the precalculated server node ranking, to provide the media item to the specified electronic device.

12. The system of claim 11, wherein the precalculated server node ranking is provided to at least a plurality of the server nodes.

13. The system of claim 12, wherein the precalculated server node ranking is compressed prior to transfer to the plurality of server nodes.

14. The system of claim 12, wherein the computer-executable instructions further comprise:
determining that rankings have changed for one or more of the server nodes based on the one or more factors; and
propagating the rankings changes for those server nodes, such that the precalculated server node ranking is updated using only the rankings changes for those server nodes.

15. The system of claim 11, wherein the computer-executable instructions further comprise instructing the specified optimal server node to establish a peer-to-peer connection with the specified electronic device.

16. The system of claim 11, wherein server nodes having specified rankings in the precalculated server node ranking are selected to provide the media item to the specified electronic device according to one or more established policies.

17. The system of claim 11, wherein the computer-executable instructions further comprise validating one or more network routes between the specified electronic device and one or more of the server nodes to ensure that the network routes provide a threshold level of data transfer.

18. The system of claim 11, wherein the computer-executable instructions further comprise filtering one or more network routes between the specified electronic device and one or more of the server nodes to prevent erroneous routes or routes to malicious server nodes.

19. The system of claim 11, wherein the computer-executable instructions further comprise steering one or more subsequent media item requests to the specified optimal server node.

20. A non-transitory computer-readable medium comprising one or more computer-executable instructions that, when executed by at least one processor of a computing device, cause the computing device to: determine, for a set of electronic devices, which server nodes are capable of providing media items to the set of electronic devices, the server nodes being part of one or more specified server clusters;
from the determined server nodes, pre-calculate, prior to receiving media item requests, a server node ranking that ranks the determined server nodes according to their ability to provide the media items to the set of electronic devices according to one or more media item provisioning factors, resulting in a list of ranked server nodes;
receive a request indicating that a media item is to be provided to a specific electronic device among the set of electronic devices;
access the list of ranked server nodes indicating the precalculated server node ranking for the set of electronic devices; and
instruct a specified optimal server node, selected according to the precalculated server node ranking, to provide the media item to the specified electronic device.

* * * * *